United States Patent
Campagna et al.

(10) Patent No.: US 6,660,350 B1
(45) Date of Patent: Dec. 9, 2003

(54) ELECTRO-OPTICAL REMOVAL OF PLASTIC LAYER BONDED TO A METAL TUBE

(75) Inventors: Guido M. Campagna, Farmington Hills, MI (US); James D. McDaniel, Ortonville, MI (US)

(73) Assignee: ITT Automotive, Inc., Auburn Hills, MI (US)

( * ) Notice: Subject to any disclaimer, the term of this patent is extended or adjusted under 35 U.S.C. 154(b) by 0 days.

(21) Appl. No.: 09/493,907

(22) Filed: Jan. 28, 2000

Related U.S. Application Data

(62) Division of application No. 08/811,121, filed on Mar. 3, 1997, now Pat. No. 6,130,404.

(51) Int. Cl.[7] .......................... B29D 22/00; B29D 23/00; B32B 1/08
(52) U.S. Cl. .................. 428/36.91; 428/35.8; 428/35.9; 428/192; 138/143; 138/146
(58) Field of Search .............................. 428/35.8, 35.9, 428/36.91, 192; 132/146, 137, 138, 139, 143, DIG. 7, 141

(56) References Cited

U.S. PATENT DOCUMENTS

| | | |
|---|---|---|
| 3,070,132 A | 12/1962 | Sheridan |
| 3,166,688 A | 1/1965 | Rowand et al. |
| 3,473,087 A | 10/1969 | Slade |

(List continued on next page.)

FOREIGN PATENT DOCUMENTS

| | | |
|---|---|---|
| DE | 1779905 | 2/1972 |
| DE | 3821723 | 9/1989 |
| DE | 9001467 | 4/1990 |

(List continued on next page.)

OTHER PUBLICATIONS

Atochem Inc., *Safety Data Sheet for ADEFLON A*, 2 pp., prior to Nov. 1992.
Margolis, J., *Conductive Polymers and Plastics*, pp. 119–124 (Chapman & Hall, New York).
Central Glass Co., Ltd., *Flexible Fluoroplastic CEFRAL Soft*, pp. 1–20 (date unavailable).
Kirk–Othmer, Encyclopedia of Chemical Technology, 3d ed., vol. 18, pp. 406–425 (New York, John Wiley & Sons) (1982).
Shell Chemical Company, *Kraton Rubber—Compounds Properties Guide*, prior to Apr., 1994.
Shell Chemical Company, Kraton Thermoplastic Rubber—Processing & Fabricating Kraton Thermoplastic Rubber Compounds, pp. 1–26 (Apr. 1998).
Shell Chemical Company, *Kraton Rubber Automotive Compound Characteristics*, prior to Apr., 1994.
Shell Chemical Company, Kraton Thermoplastic Rubber—Typical Properties 1990, pp. 1–11.
Advanced Elastomer Systems, Santoprene Thermoplastic Rubber FR Grades—Material Safety Data, pp. 1–5 (Dec. 1, 1990).

(List continued on next page.)

*Primary Examiner*—Kenneth R. Rice
(74) *Attorney, Agent, or Firm*—Young & Basile, P.C.

(57) ABSTRACT

A method for preparing a multi-layer tube, useful prior to endforming for brakeline connections, comprises the steps of forming a metal tube having an outer surface and an end and bonding a corrosion resistant layer to the metal tube outer surface. A surface treatment layer is bonded to the corrosion resistant layer. A first polymeric layer is extruded onto the metal tube, such that is bonds to the surface treatment layer; and a second polymeric layer is extruded onto the metal tube, such that it bonds to the first polymeric layer. The method further comprises the step of vaporizing and removing at least a portion of the first and second polymeric layers from an area adjacent the end by rotating an axially defocused, generally elliptical cross-sectionally shaped laser beam 360° about the area, while leaving the corrosion resistant layer intact.

39 Claims, 7 Drawing Sheets

U.S. PATENT DOCUMENTS

| | | | |
|---|---|---|---|
| 3,561,493 A | | 2/1971 | Maillard et al. |
| 3,610,291 A | * | 10/1971 | Heslop ..................... 138/146 |
| 3,828,112 A | | 8/1974 | Johansen et al. |
| 3,907,955 A | | 9/1975 | Viennot |
| 3,953,706 A | | 4/1976 | Harris et al. |
| 3,960,624 A | | 6/1976 | Erlandson ..................... 156/69 |
| 4,243,724 A | | 1/1981 | Strutzel et al. |
| 4,244,914 A | | 1/1981 | Ranalli et al. |
| 4,272,585 A | | 6/1981 | Strassel |
| 4,273,798 A | | 6/1981 | Scheiber |
| 4,303,457 A | | 12/1981 | Johansen et al. |
| 4,330,017 A | | 5/1982 | Satoh et al. |
| 4,448,748 A | | 5/1984 | Radtke et al. |
| 4,614,208 A | | 9/1986 | Skarelius |
| 4,659,625 A | | 4/1987 | Decroly et al. |
| 4,675,780 A | | 6/1987 | Barnes et al. |
| 4,685,090 A | | 8/1987 | Krevor |
| 4,706,713 A | | 11/1987 | Sadamitsu et al. |
| 4,710,337 A | | 12/1987 | Nordstrom |
| 4,762,589 A | | 8/1988 | Akiyama et al. |
| 4,800,109 A | | 1/1989 | Washizu |
| 4,824,705 A | * | 4/1989 | Persson et al. ............ 428/35.9 |
| 4,853,297 A | | 8/1989 | Takahashi et al. |
| 4,880,036 A | | 11/1989 | Kitami et al. |
| 4,887,647 A | | 12/1989 | Igarashi et al. |
| 4,907,625 A | | 3/1990 | Ito et al. |
| 4,944,972 A | | 7/1990 | Blembereg |
| 4,948,643 A | | 8/1990 | Mueller |
| 4,970,367 A | | 11/1990 | Miller |
| 4,984,604 A | | 1/1991 | Nishimura |
| 4,990,383 A | | 2/1991 | Bergstrom et al. |
| 5,019,309 A | | 5/1991 | Brunnhofer |
| 5,038,833 A | | 8/1991 | Brunnhofer |
| 5,076,329 A | | 12/1991 | Brunnhofer |
| 5,112,692 A | | 5/1992 | Strassel et al. |
| 5,142,782 A | | 9/1992 | Martucci |
| 5,143,122 A | | 9/1992 | Adkins |
| 5,167,259 A | | 12/1992 | Brunnhofer |
| 5,170,011 A | | 12/1992 | Martucci |
| 5,219,002 A | | 6/1993 | Stenger et al. |
| 5,219,003 A | | 6/1993 | Kerschbaumer |
| 5,258,213 A | | 11/1993 | Mugge et al. |
| 5,284,184 A | | 2/1994 | Noone et al. |
| 5,373,870 A | | 12/1994 | Derroire et al. |
| 5,376,770 A | | 12/1994 | Kuhl et al. |
| 5,380,385 A | | 1/1995 | Derroire et al. |
| 5,383,087 A | | 1/1995 | Noone et al. |
| 5,424,508 A | | 6/1995 | Swain et al. |
| 5,425,817 A | | 6/1995 | Mugge et al. |
| 5,489,127 A | | 2/1996 | Anglin et al. |
| 5,524,673 A | | 6/1996 | Noone et al. |
| 5,529,349 A | | 6/1996 | Gibbs et al. |
| 5,590,691 A | | 1/1997 | Iorio et al. |
| 5,638,871 A | | 6/1997 | Iorio et al. |
| 5,771,940 A | * | 6/1998 | Iorio et al. ................... 138/146 |
| 5,867,883 A | * | 2/1999 | Iorio et al. ..................... 29/460 |
| 5,972,450 A | * | 10/1999 | Hsich et al. ............... 428/35.9 |
| 6,003,562 A | * | 12/1999 | Iorio et al. ................... 138/138 |

FOREIGN PATENT DOCUMENTS

| | | |
|---|---|---|
| DE | 4001125 | 12/1990 |
| DE | 4001126 | 12/1990 |
| DE | 9007303 | 12/1990 |
| DE | 3942354 | 6/1991 |
| DE | 4006870 | 7/1991 |
| DE | 4025301 | 4/1992 |
| DE | 4137430 | 5/1993 |
| DE | 4214383 | 9/1993 |
| DE | 9400522 | 1/1994 |
| DE | 4413218 | 10/1995 |
| EP | 0164766 | 12/1985 |
| EP | 0436923 | 7/1991 |
| EP | 0551094 | 7/1993 |
| FR | 2114550 | 5/1972 |
| FR | 2155585 | 5/1973 |
| FR | 2557168 | 8/1986 |
| FR | 2557564 | 8/1986 |
| GB | 2204376 | 11/1988 |
| GB | 2211266 | 6/1989 |
| GB | 2214360 | 8/1989 |
| WO | 93/25835 | 12/1993 |
| WO | 95/30105 | 11/1995 |
| WO | 97/44186 | 11/1997 |

OTHER PUBLICATIONS

Central Glass Co., Ltd., Material Safety Data Sheet, pp. 1–2 (Mar. 18, 1991).
Shell Chemical Company, Material Safety Data Sheet, pp. 1, 3, 5 (Aug. 10, 1990).
Nonmetallic Air Brake System Tubing—SAE J844, SAE Standard (Jun. 1990).
International Plastics Selector, Plastics Digest Thermoplastics and Thermosets, ed. 14, vol. 2 (1993).
EMS—American Grilon Inc., *EMS Engineering Polymers—Product Data Bulletin—GRILAMID L25FVS40—GRILAMID L25F10*, prior to Feb., 1993.
Huls America Inc., *Product Information—Vestamid Nylon 12*, prior to Jan. 1995.
Donald V. Rosato, D.P. Di Mattia & Dominick V. Rosato, *Designing with Plastic & Composites: A Handbook*, pp. B18–B33 (Van Nostrand Reinhold) (1991).
Advanced Elastomer Systems, Santoprene Thermoplastic Rubber—Product Data Sheet (Nov. 1991).
Advanced Elastomer Systems, Santropene Thermoplastic Rubber—Fluid Resistance, pp. 1–12 (1992).
DSM Thermoplastic Elastomers, Inc., Sarlink 1000 Series—Material Safety Data Sheet, pp. 1–4 (Jan. 14, 1992).
Novacor Chemicals, Inc., Sarlink 1570—Fuel Resistant Thermoplastic Elastomer for Marine Hose Applications—Data Sheet (Nov. 1989).
Novacor Chemicals, Inc., Sarlink Thermoplastic Elastomers—The Alternative TPEs (Jan. 14, 1992).
ASTM Standard B 750, *Standard Specification for Zinc—5 Aluminum—Mischmetal Alloy (UNS Z38510) in Ingot Form for Hot–Dip Coatings*, pp. 669–670, 1988.
State of California Air Resources Board—Public Hearing, pp. 1–2, A2–A4, B2–B43 (Aug. 9, 1990).
DuPont Corporation, *Tefzel Fluoropolymer—Safety in Handling and Use*, pp. 1–3, 20–21, 35–37, prior to Apr., 1992.
Vichem Corporation, Vinyl Compounds—Material Safety Data Sheet (May 30, 1990).
ASTM Designation: B117–73 Standard Method of Salt Spray (Fog) Testing, pp. 63–68, Mar. 29, 1973.
Synrad "Innovative Electro–Optics" Brochure, pp. 9–10, 13–14, Mukilteo, WA, Apr. 1996.
VHS Videotape "Pulslaser im Industriellen Einsatz," (and translation (one sheet) of German audio) Jet Lasersysteme, Huckelhoven, Germany, date unavailable.
German Newspaper Article, "Laser Prapariert Bremsleitungen," Nov. 30, 1995, One Page Translation Thereof.
"Der lack ist ab–wie lichtpulse schichten verschwinden lassen" *Industrieanzeiger* 37/96, pp. 38–41 (1996).
"Der Laserstrahl beruhrungslos und verschmutzungsfrei abtragen," *Industrieanzeiger* 37/96, p. 41 (1996).
Cols. 15 and 16 from U.S. Patent No. 5,590,691.
International Search Report dated Jul. 20, 1998 in corresponding PCT application S.N. PCT/US98/04046.
International Search Report for PCT/US 98/04046 dated Jul. 20, 1998.

* cited by examiner

ELECTRO-OPTICAL REMOVAL OF PLASTIC LAYER BONDED TO A METAL TUBE

CROSS-REFERENCE TO RELATED APPLICATIONS

This application is a divisional of pending U.S. patent application Ser. No. 08/811,121, filed Mar. 3, 1997 now U.S. Pat. No. 6,130,404.

BACKGROUND OF THE INVENTION

This invention relates to electro-optical removal of a plastic layer bonded to a metal tube, and more particularly to laser removal of the plastic layer without damage to any corrosion resistant layer bonded to the metal tube.

In the automotive industry, it is typical to create what are called "ISO" or "SAE" flared endforms on high pressure fluid conduits, particularly brake tubes. Automotive manufacturers mandate that the front and back flare faces be free from substantial polymeric layers. The manufacturers are concerned over a potential loss of assembly torque over the long term of a vehicle's life which could occur if the relatively soft polymeric material, eg. nylon, should extrude out of the sealing area and fitting compression area after assembly.

The polymeric material is present on the outer surfaces of the fluid conduits in order to greatly enhance the corrosion resistance of the metal tubing comprising the conduits. Thus, manufacturers of these conduits, especially when end use will be under a vehicle body, do not want to remove any more of this corrosion resistance-enhancing polymeric material than is necessary, eg. for example, not past a flare into the straight section of the tube. Further, the metal tubing generally has a corrosion resistant layer bonded to the metal tube outer surface. As such, it is highly desirable that any removal process not damage the corrosion resistant layer beneath the polymer, nor the outer surface of a bare metal tube (if no corrosion resistant layer has been bonded thereto).

Several methods have been tried, with varying levels of success. However, each method has serious drawbacks, preventing the use thereof. A rotary lathe cut method uses a chuck holder with lathe style square tool bits. It is mounted on a standard rotary head deburring unit. The method is simple and reliable; however, results revealed that the nylon does not easily machine off. Strings/burrs are left on, particularly at the transition line. Further, infinite adjustments and measurements would have to be made due to the tube O.D. variance, to attempt to prevent cutting through the substrate.

A method using rotary brushes employs the use of a grinding wheel head driving a brush. The tube was held and rotated by hand. The area where the coating is to be removed is forced into the brush, and the transition line is determined by locating a protective sleeve over the tube at the desired location. The sleeve used is about 2" long and held in place with a set screw. Unfortunately, this method requires a complex adjustment mechanism to compensate for brush wear. Further, it is very difficult to determine if only the nylon would be removed. Other brushes have been tried with no real success.

A square head punch method uses a blunt nose punch that has a fixed diameter hole that goes over the steel tube and pushes the nylon to a desired distance. The "pushed back" nylon material is then cut off and removed via a rotary lathe cut system. This method has the drawback that it would be impossible to predict the amount (thickness) of nylon removed or conversely, left on, and it would dig into any corrosion resistant coating.

A water jet knife method involves the use of a high pressure water jet system to cut and blow off a nylon coating without affecting a ZnAl substrate. The method involves rotating the tube at high rpm while a stationary high pressure water jet removes the coating. The travel speed of the jet was 12"/minute (=0.2"/sec.). The entire system uses 50 Hp of power (=37.3 KW). This method does appear to remove the nylon coating without affecting the corrosion resistant coating, it is forgiving to the O.D. and ovality variances and has a very fast cycle time. However, it is difficult and costly to have high rpm tube rotation; the system uses ultra clean water as the removal medium (which is expensive), and it is not economical to recycle the water. The water will be a problem to the exposed ends of the tube. A further drawback is that there are high maintenance costs for the system.

In German Patent No. DE 44 13 218, there is disclosed a device for the contactless removal of a layer of lacquer or plastic, for example PTFE, from a component by means of a pulsed laser beam. This method removes a coating without damage to a primer underneath. However, it appears that the laser energy is guided to any location within a semicircular work space. As such, it appears that the laser energy would not be rotatable around a workpiece, thus requiring rotation of the workpiece, which adds to production costs. Further, it does not appear that the disclosed method removes more than a single layer. A further drawback is that the disclosed machine, comprising articulated opto-mechanical arms, is large, complex and very expensive.

Thus, it is an object of the present invention to provide a method for the fast, efficient, precise and cost effective removal of one or multiple-polymeric layers from a metal substrate. Further, it is an object of the present invention to provide such a method which will not damage the substrate or any corrosion resistant coating thereon. Still further, it is an object of the present invention to provide such a method which leaves a smooth transition portion to aid in subsequent connections. It is yet another object of the present invention to provide such a method which optionally leaves a residue for enhanced corrosion resistance on the removed surface. It is still another object of the present invention to provide such a method which is forgiving to outer diameter and ovality variances.

SUMMARY OF THE INVENTION

The present invention addresses and solves the above-mentioned problems and achieves the above-mentioned objects and advantages by providing a method for preparing a multi-layer tube, comprising the steps of forming a metal tube having an outer surface and an end and bonding a corrosion resistant layer to the metal tube outer surface. A surface treatment layer is bonded to the corrosion resistant layer. A first polymeric layer is extruded onto the metal tube, such that it bonds to the surface treatment layer; and a second polymeric layer is extruded onto the metal tube, such that it bonds to the first polymeric layer. The method further comprises the step of vaporizing and removing at least a portion of the first and second polymeric layers from an area adjacent the end by rotating an axially defocused, generally elliptical cross-sectionally shaped laser beam 360° about the area, while leaving the corrosion resistant layer intact.

BRIEF DESCRIPTION OF THE DRAWINGS

Other objects, features, advantages and applications of the present invention will become apparent by reference to the following detailed description and to the drawings, in which.

DETAILED DESCRIPTION OF THE PREFERRED AND ALTERNATE EMBODIMENTS

Figure 1:
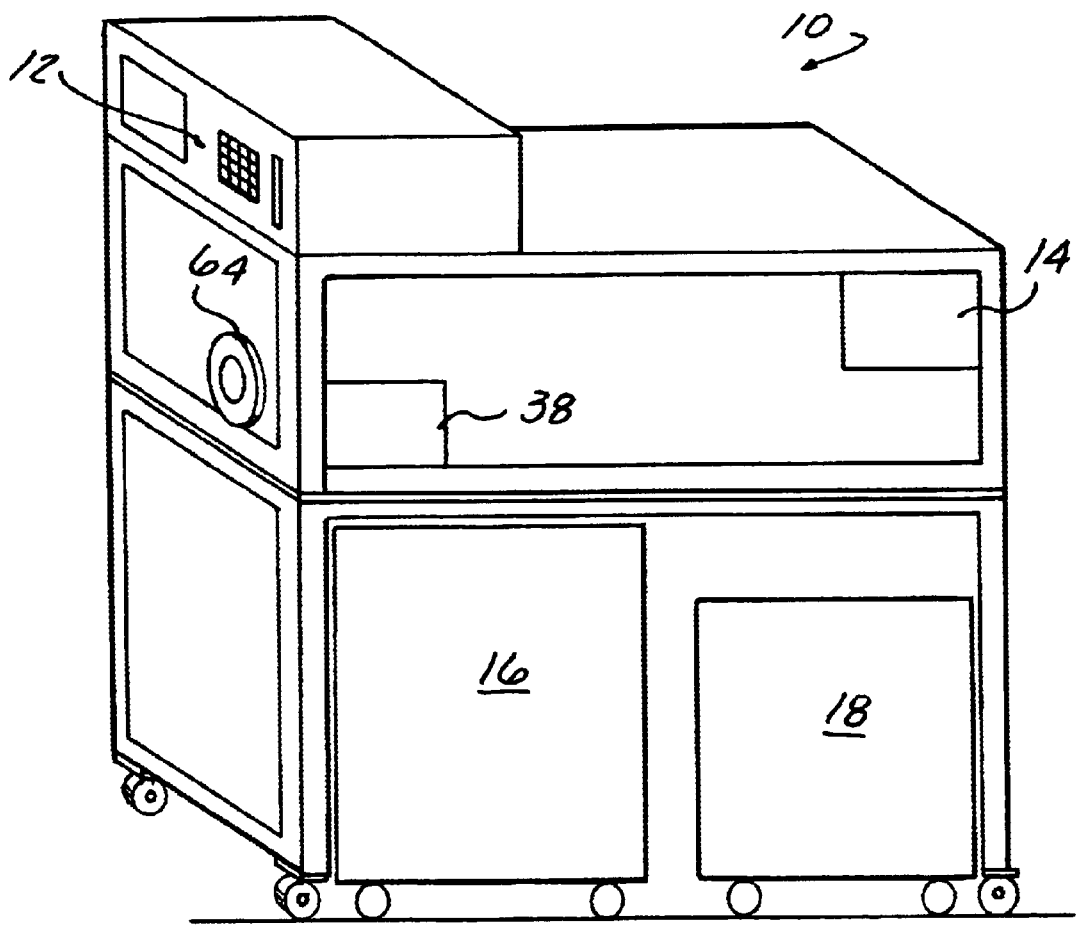
FIG. 1 is a semi-schematic perspective view of the electro-optical removal apparatus of the present invention.

Referring now to FIG. 1, the electro-optical system of the present invention for removing a plastic layer from the outer surface of a metal tube is designated generally as 10. System 10 is relatively compact and portable, being about 24" wide, 66" high and 60" long (although it is to be understood that system 10 may be made to varying sizes). System 10 includes a programmer 12 for controlling at what position and what axial length of plastic layer is removed, an RF supply 14 to power the laser generator 20, a chilled water supply 16 for cooling the laser generator 20, and an air cleaner 18 for removing gasses, fumes, any liquid or particulate plastic, and/or any other particulate matter which may be present. Further details and use of this apparatus 10 will be explained hereinafter in reference to the method of the present invention.

Figure 4:
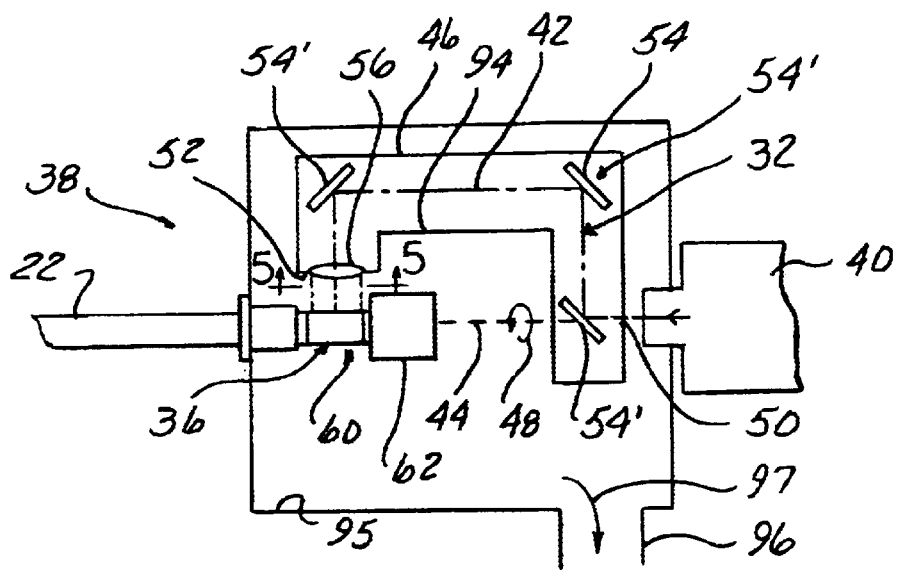
FIG. 4 is a partially cut away, semi-schematic view of the beam delivery system.
Figure 5B:
FIG. 5B is a cross sectional view taken on line 5—5 of FIG. 4 showing an alternate generally elliptical cross sectional shape of the laser beam as it impinges the polymeric layer portion of the multi-layer tube.
Figure 5A:
FIG. 5A is a cross sectional view taken on line 5—5 of FIG. 4 showing the generally elliptical cross sectional shape of the laser beam as it impinges the polymeric layer portion of the multi-layer tube.
Figure 6:
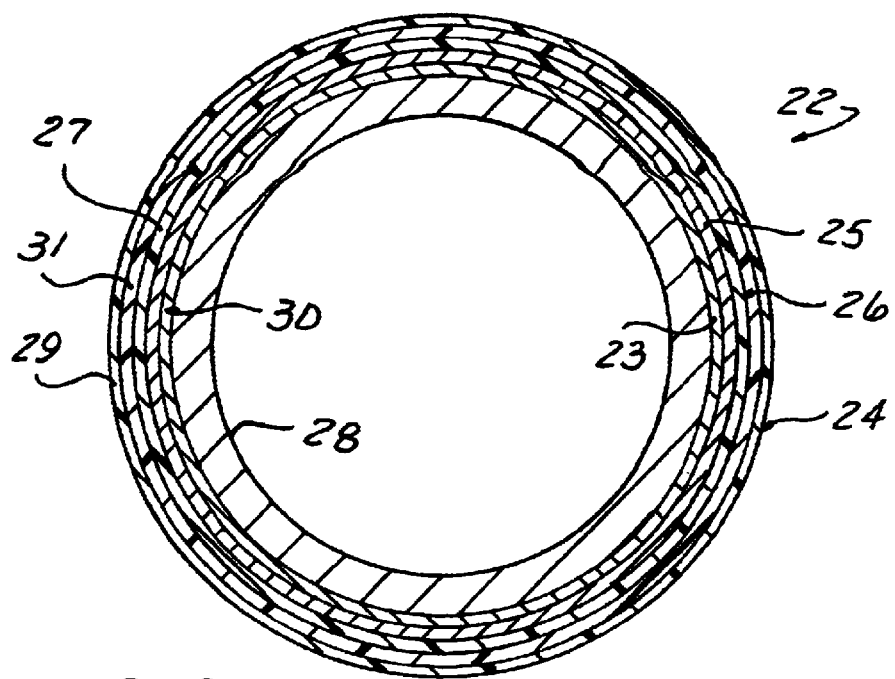
FIG. 6 is an enlarged, cross sectional view of the multi-layer tube taken on line 6—6 of FIG. 3, with the layer thicknesses exaggerated for purposes of illustration.

Referring now to FIGS. 4–6, the method for preparing a multi-layer tube 22 according to the present invention comprises the step of substantially removing at least a portion 36 of a polymeric layer, designated generally as 24, from an outer surface circumference 26 of a substantially non-rotating metal tube 28 having a corrosion resistant coating layer 30 applied thereto, by axially defocusing a laser beam 32 from a pinpoint cross-sectional shape 42 to a generally elliptical cross-sectional shape 34 onto the polymeric layer portion 36. The generally elliptical cross-sectionally shaped laser beam 34 vaporizes the polymeric layer portion 36 while leaving the corrosion resistant layer 30 (or simply the metal tubing substrate, if no corrosion resistant layer 30 is applied) intact. Without being bound to any theory, it is believed that this phenomenon may occur because the defocused laser beam, having the unique generally elliptical cross-section 34 as described herein, causes the laser energy to be absorbed by the plastic layer or layers in varying degrees, but is reflected by the metal tube 28. Thus, the laser beam 32 removes the polymeric portion 36, while leaving a smoothly tapered transition portion 74 (discussed in detail hereinbelow), without damaging the substrate.

The axial defocusing is accomplished by a beam delivery system 38. The system 38 comprises a laser beam generator 40 emitting the pinpoint cross-sectionally shaped laser beam 42.

It is to be understood that any suitable laser apparatus having a suitable laser beam generator 40 may be used. However, in the preferred embodiment, a $CO_2$ laser having a wavelength of 10.59 microns is used. This laser may have a power ranging between about 50 Watts and about 240 Watts. In the preferred embodiment, either a 100 Watt or a 200 Watt continuous laser may be used, as well as any power ranging therebetween. Such lasers are available from Synrad in Mukilteo, Wash.: the 100 Watt laser is commercially available as Model 57-1, and has a sealed, RF-excited, water-cooled laser head; the 200 Watt laser is available as Model 57-2, and has two standard 57-1, 100 Watt laser tubes mounted side by side, but rotated 90° with respect to each other, feeding an optical beam combiner.

The beam delivery system 38 further comprises means, operatively connected to the beam generator 40, for defocusing the pinpoint cross-sectionally shaped laser beam 42 into the generally elliptical cross-sectionally shaped laser beam 34. The beam delivery system 38 may further comprise means, operatively connected to the beam generator 40 and the defocusing means, for reflecting one of the pinpoint cross-sectionally shaped laser beam 42 and the generally elliptical cross-sectionally shaped laser beam 34 to a position adjacent the polymeric layer portion 36.

As shown in FIG. 4, the laser beam 42 enters the reflecting means along an axis 44. The reflecting means comprises a generally C-shaped housing 46 which rotates 360° about the axis 44 (see rotational arrow 48). The housing 46 has a laser beam entry 50 and a laser beam exit 52. The reflecting means further comprises a mirror system, designated generally as 54, disposed within the housing 46, the mirror system 54 adapted to reflect at least one of the pinpoint cross-sectionally shaped laser beam 42 and the generally elliptical cross-sectionally shaped laser beam 34 from the entry 50 to the exit 52. It is to be understood that the mirror system 54 may be comprised of one or multiple mirrors 54', with the mirrors 54' having any suitable size and/or shape. Although the above-described reflecting means is the preferred embodiment thereof, it is to be understood that the reflecting means may comprise any means suitable to achieve the objects and advantages of the present invention.

An example of a suitable reflecting means apparatus having a rotating mirror system 54 as described above is commercially available from RTMC in Phoenix, Ariz., under the tradename WD-1LTC-100 (one of the WD-1 PersonaLaser® Briefcase Portable series), which is a 100 Watt Turnkey laser wire stripping system. The WD-1LTC-100 apparatus (which does not include the unique defocusing means as described herein) is used to strip wire, cables, conductors, coaxial cables and the like (primarily in the aircraft industry) by making a thin cross cut down to the wire or cable surface about the wire or cable circumference, leaving the slug on. The apparatus may also make an axial cut to make the slug easier to remove. In short, the apparatus without the unique defocusing means of the present invention basically utilizes the laser beam as a knife.

Figure 2:
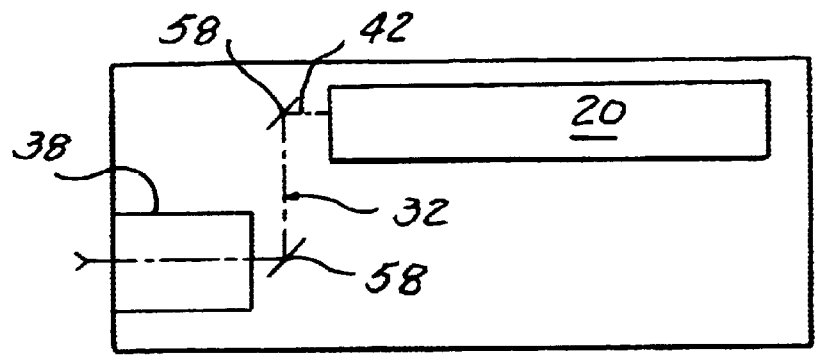
FIG. 2 is a semi-schematic top view of the electro-optical removal apparatus.

It is to be further understood that the defocusing means may comprise any suitable means. However, in the preferred embodiment, the defocusing means comprises a defocusing lens 56 disposed within housing 46. It is to be understood that any defocusing lens suitable to achieve the objects and advantages of the present invention may be used. It is preferred that such a lens have a focal length ranging between about 1.5" and about 3", and more preferably between about 2" and about 2.5". An example of such a suitable lens, used in the preferred embodiment, is a ZnSe 2.5" focal length×0.750" cylindrical diameter lens, commercially available from Level 4 Laser Systems in Novi, Mich. as Model II–VI. As best shown in FIG. 4, mirror system 54 reflects pinpoint cross-sectionally shaped laser beam 42, defocusing lens 56 is mounted adjacent laser beam exit 52, and generally elliptical cross-sectionally shaped laser beam 34 is emitted through laser beam exit 52. It is to be understood that laser beam generator 40 may be directly adjacent the C-shaped housing 46, as shown in FIG. 4; or it may be offset, as shown in FIG. 2, and transmitted to C-shaped housing 46 via a second appropriate mirror system 58. In the preferred embodiment, laser 20 is offset as shown in FIG. 2.

The reflecting means and defocusing means are assembled, as shown in FIGS. 1 and 4, in an environmentally safe manner. System 10 may further comprise an air nozzle (not shown) directed at end 60 area, for aiding in blowing off polymeric layer portion 36 from tube outer surface 26. This nozzle may operate within any suitable parameters, however, in the preferred embodiment, the nozzle operates at 4–8 cfh at 5–10 psi. Interior 94 of C-shaped housing 46 is pressurized, while outside housing 46, beam delivery system housing 95 has a vacuum applied thereto sufficient to draw out any gasses, fumes, any liquid or particulate plastic, and/or any other particulate matter which may be present through outlet 96 (as shown by arrow 97) to air cleaner 18 (which may comprise a three stage filtering system), which is then vented to atmosphere. As an example of suitable pressurization, a blower develops 160 scfm at 1" water column. Thus, any workers in or near the area of the system 10 of the present invention should be safe from any possible toxicity which may exist during the polymeric layer removal.

Figure 3:
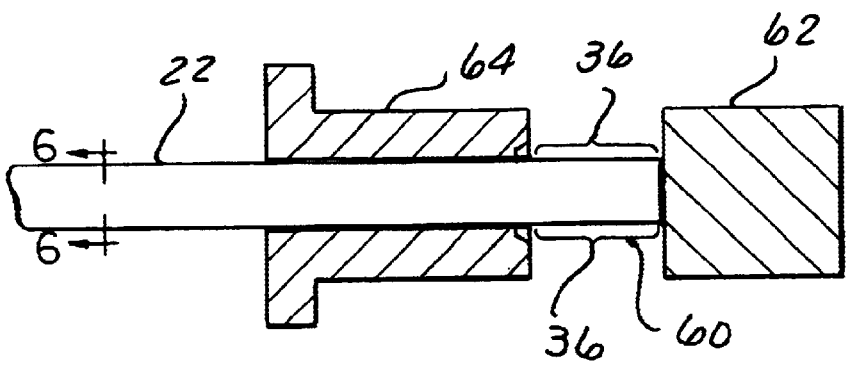
FIG. 3 is a partially cut away, cross sectional view of the removable bushing and adjustable stop, showing a portion of a metal tube inserted within the bushing and abutting the stop.

Polymer portion 36 is removed in the following manner, as best seen in FIG. 4. An end 60 of multi-layer tube 22 is positioned adjacent laser beam exit 52 against adjustable stop 62, and multi-layer tube 22 is centered on axis 44. Tube 22 is received within, and held in place by a replaceable steel entry bushing 64. Bushing 64 may be replaced dependent upon the size of tube 22 to be inserted therein. For example, a 3/16" tube uses an entry bushing 64 having a diameter of approximately 0.213±0.002" (the following bushing diameters are approximately ±0.002"): for a 1/4" tube, the bushing diameter would be approximately 0.275"; for a 5/16" tube, approximately 0.337"; and for a 3/8" tube, approximately 0.400". As seen in FIG. 3, polymer portion 36 subject to removal is held between the stop 62 and the bushing 64. This portion 36 (shown by brackets in FIG. 3) is the portion that is exposed to the generally elliptical cross-sectionally shaped laser beam 34.

Figure 7A:
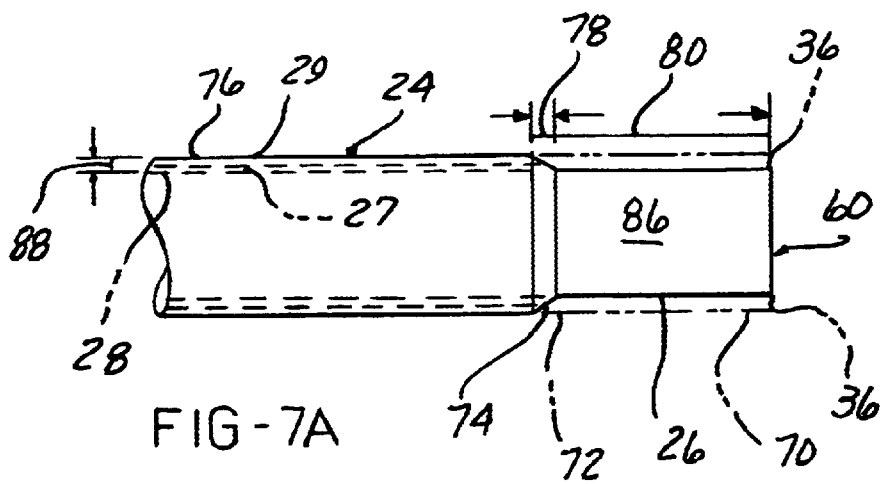
FIG. 7A is an enlarged, partially cut away view of the multi-layer tube showing the polymeric layer portion removed, and the tapered transition portion.
Figure 7B:
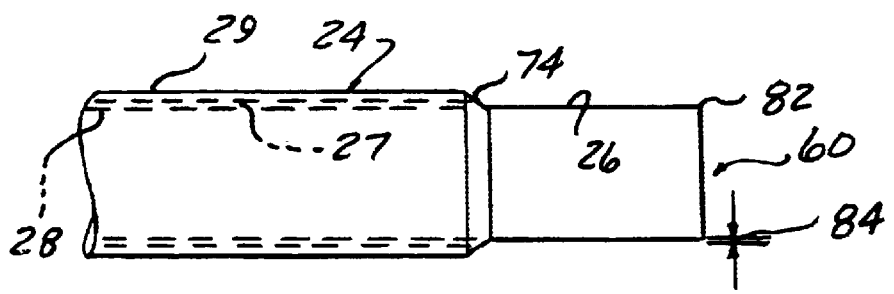
FIG. 7B is a view similar to FIG. 7A, but also showing the ultra thin, corrosion resistance-enhancing polymeric residue.

Examples of suitable beam cross sections are shown in FIGS. 5A and 5B. As best seen in FIG. 5A, this laser beam 34 has two sides, 66, 68, wherein, preferably, one side 66 is more curved than the other side 68. Even more preferably, as shown in FIG. 5B, the other side 68' is generally pointed, and the one side 66' is generally curved. As can be seen in FIGS. 7A and 7B, polymeric layer portion 36 has a first area 70 adjacent the tube end 60 and a second area 72 distal from the tube end 60. The curved side 66 of the generally elliptical cross-sectionally shaped laser beam 34 substantially contacts the first area 70, while the generally pointed side 68 substantially contacts second area 72.

Without being bound to any theory, it is believed that this unique generally elliptical cross-sectional shape 34 having sides 66, 68 and/or 66', 68' aids in forming the generally tapered, smooth transition portion 74 of the polymeric layer 24, which transition portion 74 extends from an upper surface 76 toward the metal tube outer surface circumference 26. It is believed that this is due to first area 70 seeing a more intense amount of laser energy, while simultaneously, the polymeric portion 36 sees a progressively less intense laser energy, the closer the portion 36 is to second area 72.

Referring again to FIGS. 7A and 7B, there is shown a metal tube 28 having a first polymeric layer 27 bonded thereto, and a second polymeric layer 29 bonded to first layer 27. The layers 27, 29 are shown as remaining distinct within the transition area 74; however, these layers 27, 29 may not be so distinct in practice of the present invention. Nonetheless, the layers 27, 29 (or any number of layers and/or sublayers) within the transition portion 74 will have a sealed, smooth outer surface, leaving no jagged, rough edges exposed to the surface (which may occur in laser removal systems lacking the unique transition portion 74 of the present invention).

It is to be understood that the length 78 of the smoothly tapered transition portion 74 may vary substantially. However, in the preferred embodiment, this length 78 is less than about 2 mm (0.08"); and more preferably is approximately 1.27 mm (0.05"). The polymeric layer portion 36 removed also has a length 80 which may vary substantially; however, in the preferred embodiment, this length 80 ranges between about 1 mm (0.04") and about 76.2 mm (3"); preferably length 80 ranges between about 4 mm (0.157") and about 8 mm (0.315"); and more preferably, length 80 ranges between about 6 mm (0.236") and about 7 mm (0.276").

Referring now to FIG. 7B, the multi-layer tube 22 may optionally further comprise an ultra thin, shiny, corrosion resistance-enhancing polymeric residue 82 on a discrete area of the metal tube outer surface circumference 26 after polymeric layer portion 36 removal therefrom. The ultra thin residue 82 may have a greatly varying thickness; however, in the preferred embodiment residue 82 has a thickness 84 (which is shown greatly exaggerated for illustrative purposes in FIG. 7B) sufficient to enhance the corrosion resistance of the laser removed metal tube outer surface circumference 86 such that the laser removed metal tube outer surface circumference 86 improves its corrosion resistance significantly over an outer surface circumference 86 having no polymeric layer 24 and no residue 82 thereon.

In the preferred embodiment, the laser removed metal tube outer surface circumference 86 passes up to about 1100 hours of Standard Method of Salt Spray (Fog) Test ASTM B 117-73 before forming red rust buildup larger than about 1 mm (0.04") in diameter. A metal tube 28 having a corrosion resistant coating layer 30 without any polymeric layer 24 at all thereon can only pass up to between about 600 and about 800 hours of the test; whereas a metal tube 28 with corrosion resistant layer 30 and a polymeric layer 24 comprising one or multiple individual polymeric layers passes between up to about 5000 to 8000 or more hours before forming red rust buildup larger than about 1 mm (0.04") in diameter. Thus, the ultra thin polymeric residue 82 provides intermediate protection between a tube 28 having no polymeric layer 24 and a metal tube 28 having a full polymeric layer 24 thereon.

As described in more detail hereinbelow, polymeric layer 24, which may comprise one or multiple individual polymeric layers, may have a varying thickness 88. However, in the preferred embodiment, this thickness 88 ranges between about 170 microns (0.0068") and about 202 microns (0.0081").

Due to the rotation of the C-shaped housing 46 and generally elliptical cross-sectionally shaped laser beam 34 emitted therefrom rotating 360° about end 60 of multi-layer tube 22, the polymeric layer portion removal 36 may be accomplished quickly, without rotating the tube 22, and in a single pass. The cycle time for removal has a time ranging between about 1 second and about 4 seconds. However, in the preferred embodiment, the polymeric layer portion 36 removal is accomplished in approximately 3.5 seconds.

The C-shaped housing 46, and consequently the laser beam 32 emitted through exit 52 may move from end 60 axially inward to about 3 inches; however, in the preferred embodiment, the C-shaped housing 46 does not substantially move axially with respect to tube 22, but rather moves rotationally thereabout. This is advantageous in that, among other advantages, it allows for a faster cycle time. Further, since metal tube 22 in the preferred embodiment is a fixed, non-rotating workpiece, the electro-optical process of polymeric layer portion 36 removal according to the present invention is less costly, more efficient, simpler to operate, and lends ease in manufacturing. As a specific example of one of the many advantages, the non-rotation of the tube 22 aids in maintaining polymeric layer coating integrity. This is due to the fact that, when rotating a tube 22 which may have a degree of bowing to it, and which rotation may cause considerable vibration in the tube nuts, the polymeric coating could possibly be damaged.

Figure 8:
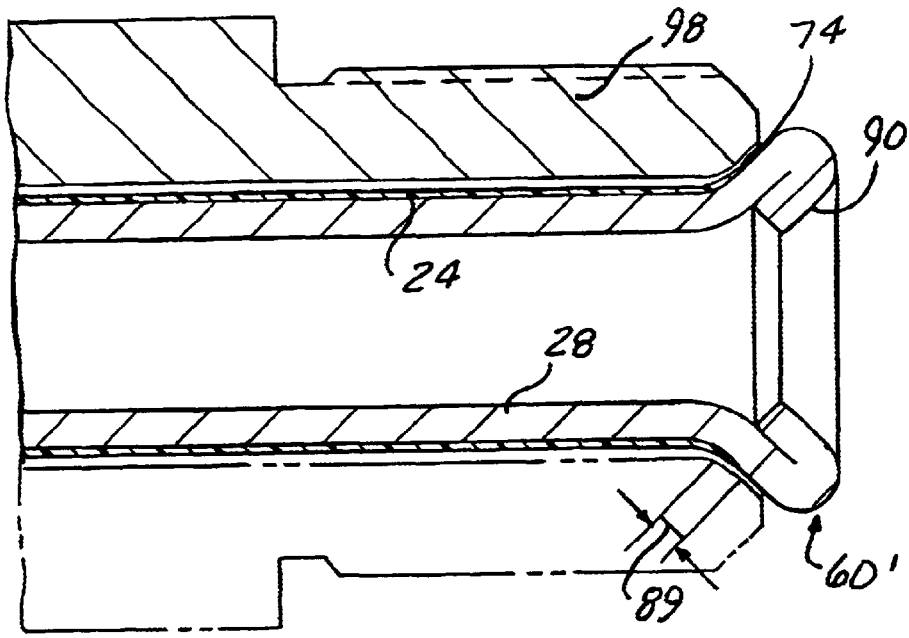
FIG. 8 is an enlarged, cut away cross sectional view of an SAE-type double or inverted flare, showing the lower half of the endform in phantom and showing the laser removed surface on the flare.
Figure 9:
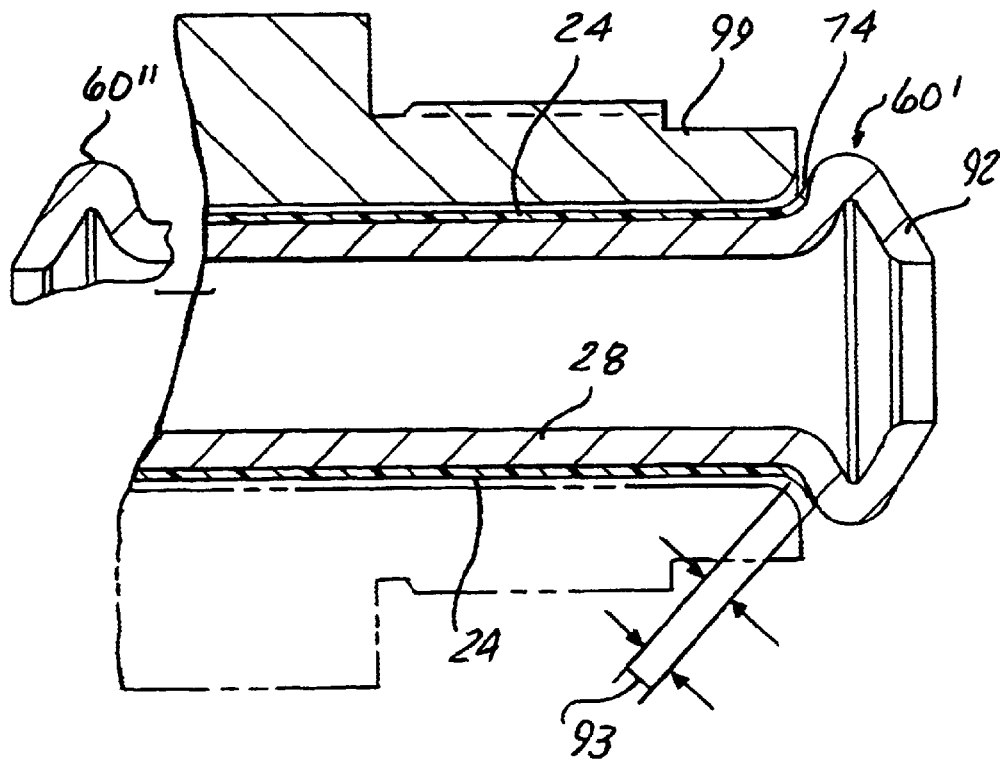
FIG. 9 is an enlarged, cut away cross sectional view of an ISO-type annularly protruding flare, showing the lower half of the endform in phantom and showing the laser removed surface on the flare.

The method of the present invention has particular use for high pressure fluid conduits having two ends 60', 60", with the polymeric layer portion 36 removed from each end 60', 60". The method may further comprise the step of endforming each of the conduit two ends 60', 60" into either an SAE-type double or inverted flare 90, as shown in FIG. 8 in an appropriate tube nut 98; or an ISO-type annularly protruding flare 92, as shown in FIG. 9 in an appropriate tube nut 99. Such endforming has particular use to prepare multi-layer tubing for brakeline connectors. Examples of suitable endforming apparatus may be found in U.S. Pat. Nos. 5,529,349 and 5,489,127. It is to be understood that the above description of SAE and ISO enforms are exemplary, and that the method of the present invention may be applicable to prepare tubing 22 for many other forming and/or endforming operations.

As shown, each of the flares 90, 92 is formed approximately where the polymeric layer portion 36 is removed.

The center of radius on the SAE endform is designated 89; and the center of radius on the ISO endform is designated 93. In the preferred embodiment, the polymeric layer 24 is removed to within this range. For a ³⁄₁₆" tube size, the length of the centers 89, 93 of radius is approximately 0.8 mm. As can be seen, the smoothly tapered transition portion 74 covers a portion of the back surfaces of the flares 90, 92. The transition portion 74 thereby leaves no blunt or rough edges to catch on bushings, tooling and/or connections and the like when the tube 22 is inserted therein and/or therethrough.

The metal multi-layer tube 22 may be particularly advantageous as at least one of a brakeline, a vacuum line, a transmission oil cooler line, a vapor return line, or a fuel line. In addition to any other applications discussed further hereinbelow, tube 22 may also have application in other areas.

The method of the present invention may remove one or more polymeric layers from a multi-layer tube 22. It is to be understood that corrosion resistant layer 30 on metal tube 28 of multi-layer tube 22 is optional. Further, if multi-layer tube 22 does have a corrosion resistant layer 30, there may or may not be a surface treatment layer bonded thereto; ie. the surface treatment layer is also optional.

In the preferred embodiment, the tube 22 is hand-fed into electro-optical removal system 10; however, it is to be understood that system 10 of the present invention may easily be adaptable to a more complex progressive/transfer machine, where system 10 may become one of many stations. The present system 10 strips one end 60, and can be adapted for two ends by splitting the beam, energizing one end at a time. However, it is to be understood that, as mentioned above, the present invention may easily be adaptable to a more complex machine having the capability of stripping two ends 60', 60" simultaneously. Still further, the present invention may be adaptable to a machine having the capability of impinging all circumferential surfaces of one or both tube ends 60 simultaneously without rotation of the beam delivery system 38. Yet still further, the present invention may be adaptable to a machine wherein the tube 22 is rotated, with or without rotation of the beam delivery system 38.

The polymeric layers may be applied by any or all of the following exemplary, non-limitative methods: extrusion, flow coating, electrostatic spray painting, electrostatic powder coating, or shrink fitting.

It is to be further understood that any or all of the variations regarding the corrosion resistant coatings, surface treatment layers, and one or multiple polymeric layers, as well as methods for applying the same onto the metal tube 28, as described in further detail hereinbelow, may be suitable in the electro-optical system of the present invention for removing a plastic layer 24 from the outer surface 26 of a metal tube 28.

Further details on the method for preparing the multi-layer tube 22 appear hereinbelow. Corrosion can be minimized by various methods, for example, by the use of a coating of protective metal such as zinc, tin, lead, nickel or copper; by the production of oxide, phosphate or similar coatings on iron and steel surfaces; by the application of protective paints; and by rendering the surface of the metal passive. Galvanizing zinc is applied to metal surfaces by dipping into a bath of molten zinc, by electrodeposition, or by metal spraying.

In the hot process, after being thoroughly cleaned, the articles are dipped into a bath of molten zinc. The bath must be maintained at a temperature somewhat higher than the melting point of zinc. The portion of the zinc surface through which the material to be coated enters the zinc bath is kept covered with a flux; ammonium chloride and zinc chloride are widely used for this. The process is used almost exclusively for sheet, pipe and wire. One or two percent tin is often added in the coating of sheets in order to obtain a very uniform coating and to improve the surface appearance. A coating applied by hot dipping never consists of a simple layer of zinc. It is always of a composite nature, the layer adjacent to the base metal consisting of zinc-iron alloys. This layer is relatively brittle and, thereby, imposes some limitations on hot-dipped galvanized materials for certain uses. A coating of 1 oz/ft$^2$ (305 g/m$^2$) of exposed surface is considered very suitable for most conditions of service.

The electrolytic or cold process consists of setting up the articles to be coated as cathodes and an electrolytic bath of soluble zinc salts, the anode being metallic zinc and the article to be coated being connected to the cathode of the system. Both an acid sulfate and a cyanide bath are used. The high ductility of the pure zinc coating obtained is the outstanding feature of such a coating. The ease of control of the uniformity and thickness is also advantageous.

A phosphate coating, in itself, forms only a very slight degree of protection against corrosion. Coatings of this kind are not suitable for severe outdoor service. Phosphating a steel surface is an excellent method of priming prior to subsequent painting or lacquering. The phosphate can be electrolytically applied, or can be applied by spraying. The phosphate treatment is also applicable to zinc surfaces.

The multi-layer tubing 22 according to the present invention includes a metal tube or pipe 28. The metal tube 28 may be welded steel tube, brazed steel tube, aluminum, copper or stainless steel. The process of the present invention is capable of applying a multi-layer coating over any rigid or semi-rigid tubular material. Of particular interest in the present invention, is the mechanical durability and corrosion resistance advantage obtained with carbon steel in either a welded single wall or brazed double wall form of tube or piping. Application of multi-layer coatings on other materials may be of a decorative nature with some protection also being obtained, for example improved chemical resistance of the outer shell of the multi-layer coating over the underlying rigid or semi-rigid tubular material.

Figure 10:
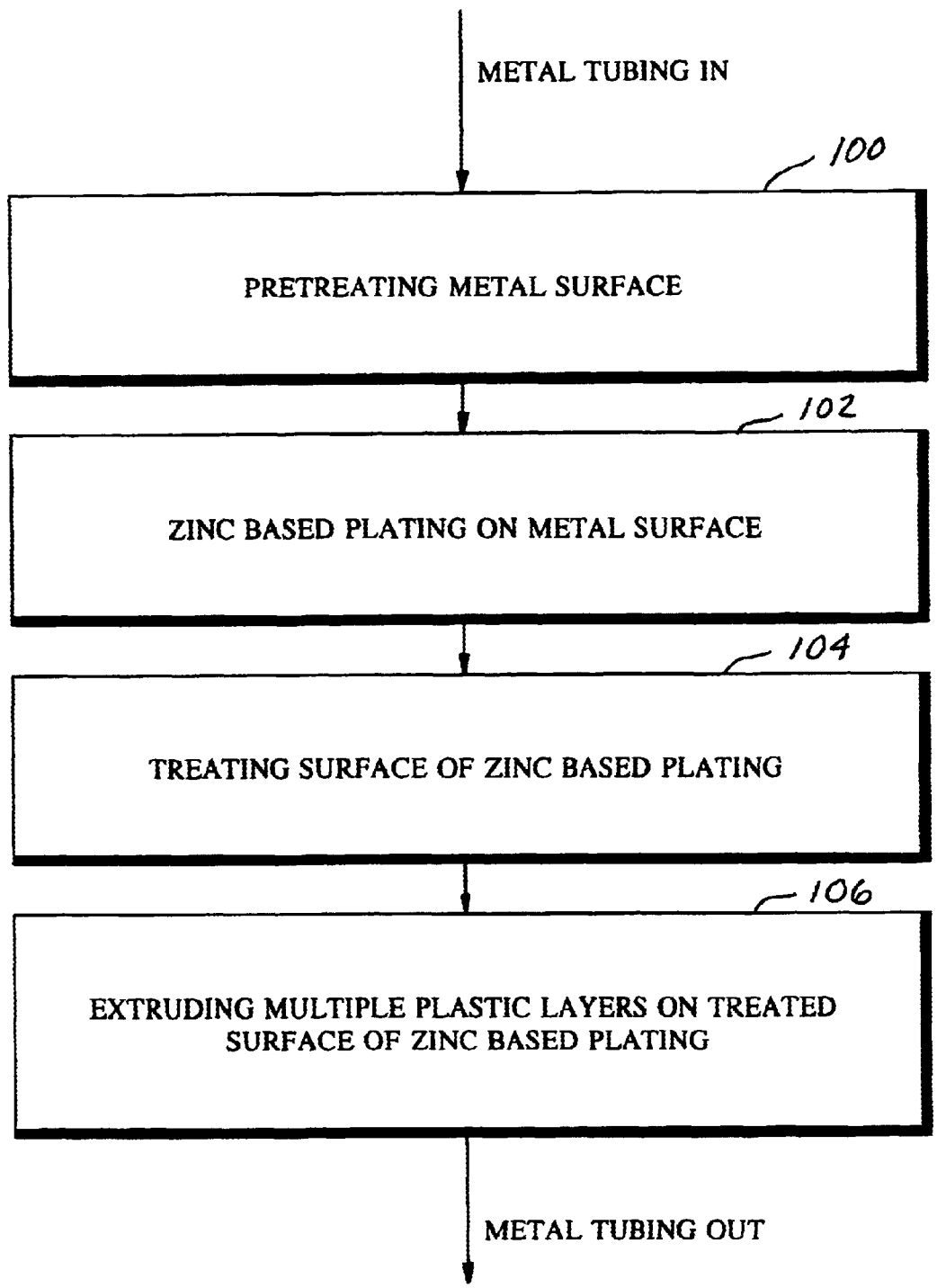
FIG. 10 is a simplified flow diagram of a process according to the present invention for extruding multiple plastic layer coatings bonded to a metal tube.

Referring now to FIG. 10, the metal tubing 28 is pretreated as required through various clean and rinse stages 100. In addition, the pretreating of the metal surface may also include pickling to remove oxides and to improve the metal surface for deposition of a metal based coating, such as a zinc based coating that is applied by hot dip galvanization, sometimes referred to as the "hot process" as previously described, or the preferred method of electrolytic bath coating or plating sometimes referred to as the "electrolytic or cold process" as previously described. In the alternative, previously pretreated metal tubing 28 may be supplied to the zinc based coating process step 102 according to the present invention, or a previously zinc base coated metal tubing 28 may be supplied to the surface treating step 104 of the process according to the present invention. In either case, metal tubing 28 with a zinc based coating applied thereon in a range of 0.4 to 1.0 mil is either produced or supplied for subsequent treating as will be disclosed hereinafter according to the present invention.

The external surface of the zinc based coating is treated to seal the zinc based coating to prolong its corrosion resistance and to provide a suitable surface for application of and bonding to extruded multiple layers of plastic to be subsequently supplied. The surface treatment of the zinc based coating is at least one of the surface sealing treatments selected from the group of a phosphate coating, a chromate coating including the clear, yellow and green versions, a zinc-aluminum alloy coating, and combinations thereof. A suitable zinc-aluminum alloy and coating is described in U.S. Pat. No. 4,448,748 which is incorporated herein by reference, and ASTM Designation: B750-88 provides a standard specification for zinc-5% aluminum-mischmetal alloy in ingot form hot-dip coatings, which is also incorporated herein by reference. Metal tubing pretreatment prior to plastic application can include combinations such as zinc-aluminum alloy with a phosphate coating and a chromate coating, zinc plate with a chromate coating, zinc plate with a phosphate coating and a chromate coating, galvanized zinc with a phosphate coating and/or a chromate coating, zinc-nickel alloy plate with a phosphate coating and/or a chromate coating, zinc-cobalt alloy with a phosphate coating and/or a chromate coating, a chromate coating of the clear, yellow and green versions, and combinations thereof. The pretreatment of the metal surface prior to the zinc base coating can include sand, shot or bead blasting, or other means of abrading the surface to roughen it, or detergent cleaning with rinse and acid pickling followed by a rinse. Any suitable surface abrading or etching process, either chemical or mechanical, may be used as a pretreatment prior to any other surface treatment and/or prior to extruding plastic onto the metal surface. The chromate coating can be applied as a wash having essentially no remaining weight. The zinc-aluminum alloy coating can be applied with a weight selected in a range of between 36 to 95 g/m inclusive, and with a preferred weight range of between 75 to 80 g/m$^2$ inclusive and a most preferred weight of 78 g/m$^2$. The phosphate coating can be applied with a weight in the range of between 120 to 250 mg/ft$^2$ (1.292 to 2.691 g/m$^2$) inclusive. The zinc based coating on the metal surface is preferably a weight in the range of between 13 to 35 microns inclusive.

Various combinations of multi-layer tubing 22 according to the present invention have been prepared with metal tube 28 having a 3/16 inch diameter brazed tube, or 5/16 inch and 3/8 inch diameter welded steel tube. The process according to the present invention is not size dependent, and therefore it is anticipated that other sizes, including smaller sizes and larger sizes, of metal tube 22 can be processed according to the present invention.

The zinc-aluminum galvanizing alloy or coating preferably contains from about 85% to 97% zinc, from about 4% to 15% aluminum and at least about 5 ppm mischmetal (a variety of known rare earth containing alloys).

After treating the surface of the zinc based coating or layer 23 with the surface treatment layer 25, multiple plastic layers are extruded on the treated surface 25 of the zinc based layer 23 in step 106. In the alternative, multiple plastic layers can be extruded on to the external surface of the metal tube 28 without pretreatment. In either case, the multiple plastic layers preferably include at least an alloy or bonding layer, referred to herein as a first layer 27 formed on top of the treated surface layer 25 and an external shell or second layer 29 exposed to the outside environment. An optional intermediate or third layer 31 may be provided between the first layer 27 and the second layer 29 and may include one or more sublayers of plastic materials. Prior to extruding the multiple plastic layers onto the treated surface 25, the metal tube 28 is preheated to temperatures in the range of between 177° C. to 232° C. (350° F. to 450° F.) inclusive, with a preferred range of between 204° C. to 232° C. (400° F. to 450° F.) inclusive. The multiple layers of extruded plastic form a coating over the treated surface 25 with an overall thickness in a range of between 75 to 300 microns (3 to 12 mils), with a preferred range of between 125 to 250 microns (5 to 10 mils). Individual plastic layers can be applied with a thickness in a range of between 10 to 250 microns (0.3 to 10 mils) inclusive, with a preferred range of between 125 to 250 microns (5 to 10 mils) inclusive.

Figure 11:
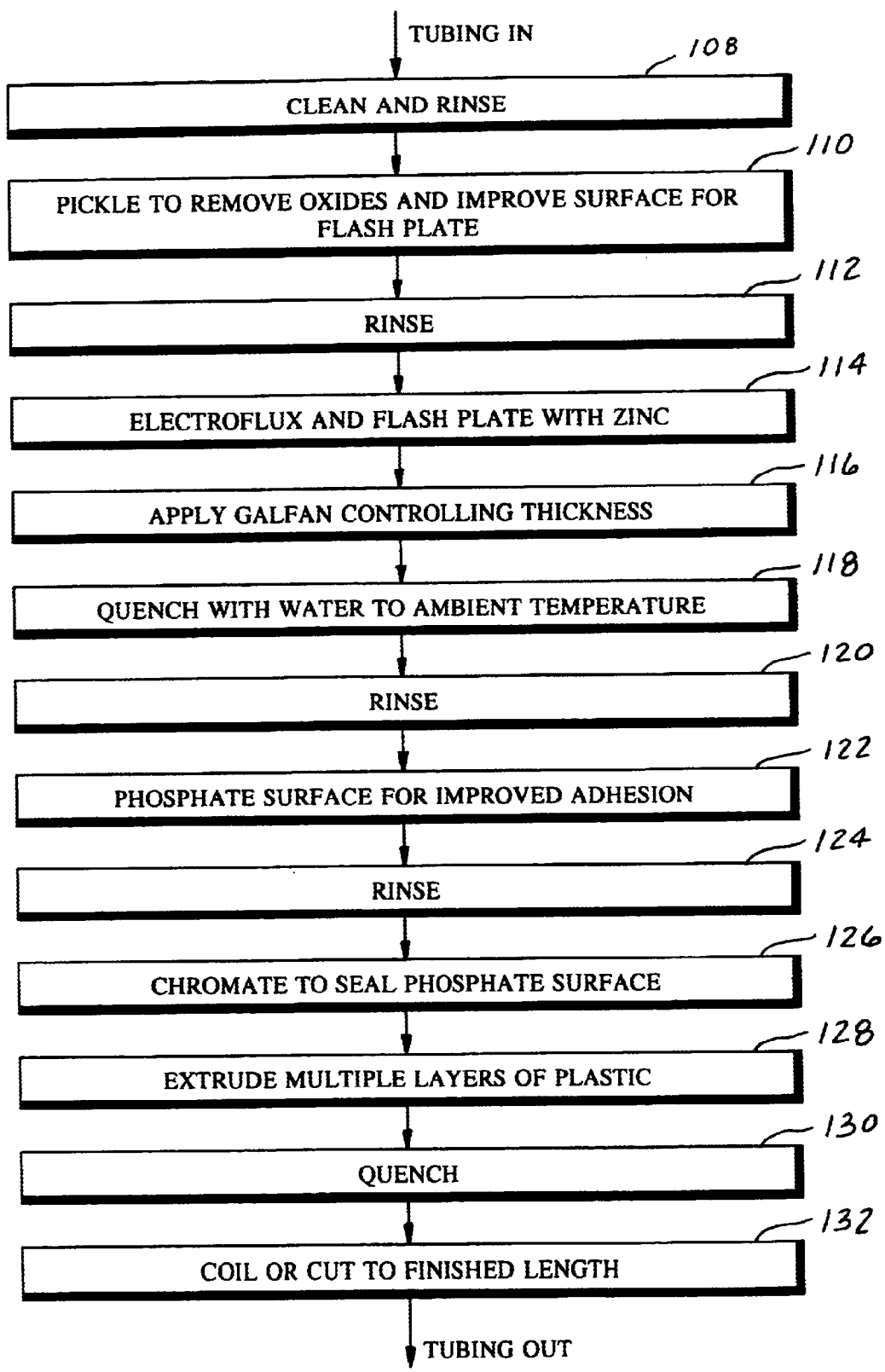
FIG. 11 is a second flow diagram of the process according to the present invention.

Referring now to FIG. 11, a more detailed flow diagram of a process according to the present invention is depicted. The tubing 28 as previously described is subjected to a clean and rinse step 108 followed by a pickling process step 110 to remove oxides and to improve the external metal surface for subsequent flash plating. After the pickling step 110, the metal tubing 28 is subjected to a rinse step 112. The electroflux and flash plate with zinc step 114 then applies the zinc based layer of a thickness in the range of 0.4 to 1.0 mil inclusive. A zinc-aluminum alloy coating is then applied to the external surface of the zinc based layer. A suitable zinc-alloy coating is commercially available under the tradename GALFAN from Eastern Alloys, Inc. of Maybrook, N.Y. The sealing step 116, of applying GALFAN while controlling the thickness in a range of 36 to 95 g/m$^2$ with a most preferred thickness of 78 g/m$^2$, is followed by a water quench step 118 to bring the tubing 28 back to ambient temperature, followed by a rinse step 120. It is to be understood that any of the quenching steps as discussed herein may be performed using any suitable material or process. Step 122 provides for a phosphate surface to be applied to the external surface of the GALFAN coating for improved adhesion of subsequent layers. A rinse step 124 follows the phosphating step 122. The application of a chromate coating occurs in step 126 to seal the phosphate surface applied in step 122. The phosphate surface is preferably applied with a thickness in the range of 120 to 250 mg/ft$^2$ (1.292 to 2.691 g/m$^2$), while the chromate coating may be applied as a wash having essentially no remaining weight on the tubing upon completion. After the chromate wash step 126, the multiple layers of plastic are extruded onto the metal tubing 28 in step 128. Preferably, the tubing has been heated in a range of between 375 to 450° F. inclusive with a preferred temperature of 425° F. prior to the application of the multiple layers of plastic in step 128. A conventional mechanical applicator or extrusion head is used for coextruding the multiple layers of plastic simultaneously onto the surface of the preheated metal tube 28. In the preferred configuration, vacuum is applied to the head of the applicator to pull the plastic material down onto the surface of the preheated tube 28. The vacuum applied is preferably in the range of 1 inch to 22 inches of water (where 28 inches of water is equal to atmospheric pressure), with a preferred vacuum pressure of 10 inches of water. After extrusion of the multiple layers of plastic in step 128, the tubing 28 is subjected to a quench in step 130, which can be a water quench, oil quench or other material quench as required, and is thereafter coiled or cut to finished length in step 132.

In lieu of coextrusion, the process could also be carried out as a cross-head application wherein the layers are applied synchronously instead of simultaneously. However, this process is not as preferred as the coextrusion, in that there is a greater likelihood of loss of bonding efficiency and bonding properties, and there tends to be less control over layer thicknesses.

Figure 12:
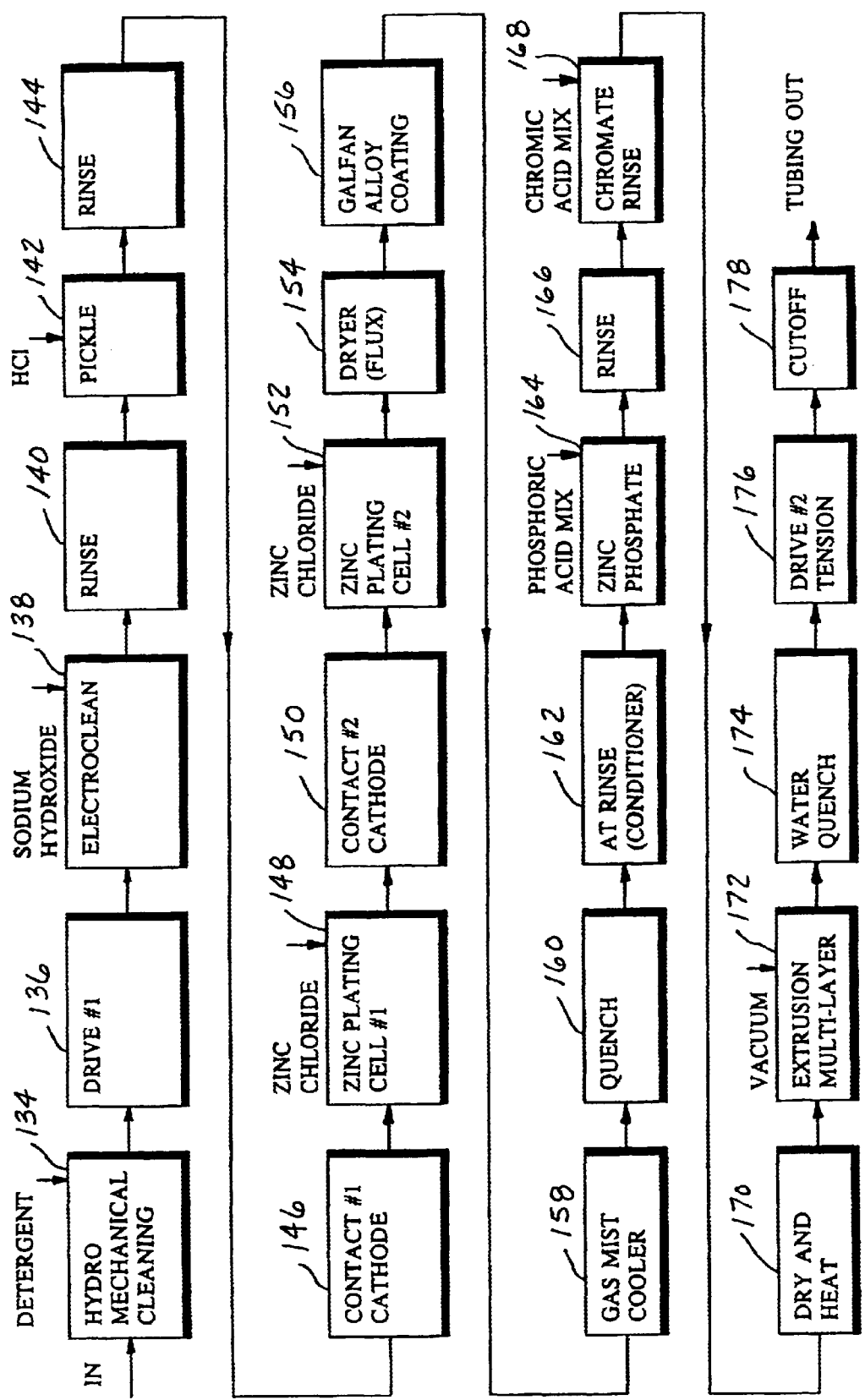
FIG. 12 is a detailed flow diagram of a process according to the present invention.

Referring now to FIG. 12, a detailed flow diagram of a process according to the present invention is disclosed. In step 134, the tubing is subjected to a hydro-mechanical cleaning with detergent additive. In step 136, the tubing is driven by a first drive unit in a continuous process through the following steps described below. The metal tubing 28 is driven through step 138 which includes an electro-cleaning process using sodium hydroxide. After the electro-cleaning process in step 138, the metal tubing 28 passes through a rinse step 140. A pickling step 142 using hydrochloric acid is followed by another rinse step 144. The tubing engages contact #1 cathode at step 146 and passes through a zinc chloride bath at zinc plating cell #1 in step 148. Thereafter, the metal tubing 28 engages contact #2 cathode at step 150 and passes through a zinc chloride bath and zinc plating cell #2 at step 152. At step 154, the metal tubing 28 is subjected to drying, where flux may be applied if appropriate. A zinc-alloy coating is applied in step 156. As previously described, a suitable zinc-alloy coating is available under the tradename GALFAN from Eastern Alloys, Inc. located in Maybrook, N.Y.

The metal tubing 28 then passes through a gas mist cooler at step 158, followed by a quench at step 160 and rinse with conditioner at step 162. The metal tubing then passes through a phosphoric acid mix where a zinc phosphate coating is applied at step 164 followed by a rinse at step 166. Thereafter, the metal tubing 28 passes through a chromic acid mix where a chromate rinse at step 168 seals the phosphate layer followed by drying and heating at step 170. After heating to the desired temperature range, the metal tubing 28 passes through an extrusion head for application of multiple plastic layers to the outer chromate sealing surface in step 172. Preferably, the vacuum is applied to the extrusion head in order to draw the plastic down into intimate contact with the chromate surface. Suitable plastic materials for the multiple layers applied to the metal tubing 28 are described in greater detail herein below. Following the extrusion process step 172, the multi-layer tubing 22 is subjected to a water quench at 174 followed by passing through drive #2 which places the tubing in tension at step 176 followed finally by a cutoff step 178 where the tubing is cut to the appropriate length or coiled as desired.

Referring now to FIG. 6, the multi-layer tube of the present invention is designated generally as 22. Multi-layer tube 22 comprises a tube or pipe 28 having an outer surface 26. Tube 28 may be formed in any conventional manner and of any suitable material. For example, tube 28 may be a welded single wall steel tube, a brazed double wall steel tube, etc. Further, aluminum, stainless steel and the like also may be used. Yet still further, tube 28 may be formed from any rigid or semi-rigid tubular material. Tube 28 may be of circular cross section as shown, however, it is to be understood that tube 28 may be formed of any suitable size and/or shape, including square, rectangular and other geometric configurations.

A suitable corrosion resistant layer 30 may be bonded to metal tube outer surface 26. In the preferred embodiment, corrosion resistant layer 30 comprises a zinc layer 23 bonded to the metal tube outer surface 26. It is to be understood that any suitable zinc layer 23 may be used in accord with the present invention. However, in the preferred embodiment, the zinc layer is selected from the group consisting of zinc plating, zinc nickel alloys, zinc cobalt alloys, zinc aluminum alloys,.and mixtures thereof.

A surface treatment layer 25 is bonded to the zinc layer 23. Any suitable surface treatment layer 25 may be used. However, in the preferred embodiment, surface treatment layer 25 is selected from the group consisting of a zinc/aluminum/rare earth alloy, phosphate, chromate, and mixtures thereof.

The phosphate and/or chromate may be applied in any suitable manner. In the preferred embodiment, a hot phosphoric acid is used. Without being bound to any theory, it is believed that this acid etches into the metal surface, leaving a phosphate crystalline structure in the metal, which structure aids in subsequent adhesion of polymeric materials. Over electroplating, a wet bath chromate may be used, after which the metal is rinsed well. Chromium oxides are left on the metal, which are believed to aid in corrosion resistance, and which, although optional, are further believed to enhance the advantageous properties of the phosphate. Over the zinc/aluminum/rare earth alloy treatment, a dry chromate may be used which does not require subsequent rinsing.

The zinc/aluminum/rare earth alloy used is preferably GALFAN, commercially available from Eastern Alloys, Inc. in Maybrook, N.Y.; licensed from the International Lead Zinc Research Organization, Inc. located in New York, N.Y.; and described in U.S. Pat. No. 4,448,748, discussed more fully above. Particularly preferred is the combination of the GALFAN with the phosphate, or the CALFAN with the phosphate and chromate. Without being bound to any theory, it is believed that either of these two combinations for the surface treatment layer 25 are particularly advantageous and useful in the present invention.

It is to be understood that the zinc layer 23 and/or surface treatment layer 25 may be optional components of the present invention. Various polymeric compositions may be applied directly to a bare metal surface, especially for decorative purposes. Further, it is contemplated that various polymeric compounds and/or blends, including those containing suitable ionomers, may substantially bond to an untreated metal surface, thereby giving the numerous corrosion and abrasion resistant properties enumerated herein.

A first polymeric layer 27 is bonded to the surface treatment layer 25. It is to be understood that any suitable polymeric layer may be used which suitably bonds to the surface treatment layer 25, and in turn, suitably bonds to subsequent polymeric layers, if any. In the preferred embodiment, the first polymeric layer 27 is selected from the group consisting of thermoplastic elastomers, ionomers, nylons, fluoropolymers, and mixtures thereof.

A second polymeric layer 29 may be bonded to the first polymeric layer 27, as shown in FIGS. 7A and 7B. It is to be understood that any suitable polymeric layer may be used which suitably bonds to first layer 27, and which provides suitable mechanical and chemical corrosion resistance. In the preferred embodiment, the second polymeric layer 29 is selected from the group consisting of nylons, thermoplastic elastomers, fluoropolymers, and mixtures thereof.

The multi-layer tube 22 may further comprise a third polymeric layer 31 interposed between, and bonded to the first and second polymeric layers. It is to be understood that any suitable polymeric layer may be used which suitably bonds to first layer 27 and to the second layer 29 and which may optionally provide suitable cushioning, if desired. In the preferred embodiment, the third polymeric layer 31 is selected from the group consisting of ionomers, nylons, ethylene vinyl alcohol, polyolefins, and mixtures thereof.

It is to be understood that any or all of the three layers, 27, 29, 31 may include multiple sub-layers (not shown). Further, it is to be understood that each of the layers and/or sublayers may be formed from a single compound listed in the relevant group, or from a combination thereof. Still further, it is to be understood that each of the layers/sublayers may be comprised of the same material. The thickness of the combined polymer layers can be as little as 0.004 inch, and can be made even thinner. Successful coatings have been applied having combined polymer layer thicknesses of 0.004 inch, 0.005 inch, 0.006 inch, 0.007 inch, 0.009 inch and 0.010 inch, with a preferred range of 0.005 inch to 0.010 inch.

Examples of suitable compounds for each of the layers will be described hereinafter.

One of the advantages of the present invention is that a chemical or mechanical bond is formed between all the layers. It is believed that good bonding prevents moisture buildup beneath the layers, which buildup greatly increases the likelihood of corrosion.

An ionomer is a thermoplastic polymer that is ionically crosslinked. Ionomer technology entails the reaction of copolymers to form bonds between the acid groups within a chain and between neighboring chains. Ionomers generally consist of an organic backbone bearing a small proportion of ionizable functional groups. The organic backbones are typically hydrocarbon or fluorocarbon polymers and the ionizable functional groups are generally carboxylic or sulfonic acid groups. These functional groups, which generally reside on no more than about 10% of the monomer units in the polymer, may be neutralized, for example with sodium or zinc ions.

The presence of these ionic groups gives the polymer greater mechanical strength and chemical resistance than it might otherwise have. The ionomer is resistant to dissolution in many solvents because of its unconventional chemical character, often being too ionic to dissolve in non-polar solvents and too organic to dissolve in polar solvents. A variety of ionomers include copolymers of: styrene with acrylic acid; ethyl acrylate with methacrylic acid; and ethylene with methacrylic acid.

The presence of ions in an otherwise organic matrix is generally not thermodynamically stable. As a result, these materials undergo slight phase separation in which the ions cluster together in aggregates. These ionic clusters are quite stable and may contain several water molecules around each metal ion. They act partly as crosslinks and partly as reinforcing filler, which may provide the greater mechanical strength that ionomers exhibit.

A further general discussion of ionomers can be found in *The Chemistry of Polymers* by John W. Nicholson, published by the Royal Society' of Chemistry, Thomas Graham House, Cambridge England (1991), pp. 147–149.

It is to be understood that any suitable ionomer resin may be used in the present invention, which suitable ionomer resin has substantially similar physical properties and performs in a substantially similar manner to the ionomers disclosed herein. Without being bound to any theory, it is believed that the presence of the ionomer may greatly enhance the excellent bonding formed between the metal surfaces 26, 23, 25 and the subsequent polymer layer(s). In the preferred embodiment, SURLYN ionomer resins are used. Other suitable ionomers are commercially available under the tradename IOTEK from Exxon Chemical Co. located in Houston, Tex.

SURLYN® is an ionomer resin commercially available from E.I. DuPont de Nemours & Co., located in Wilmington, Delaware. The chemical name of SURLYN is ethylene methacrylic acid copolymer—partial metal salt.

Its chemical formula is represented as $[(CH_2-CH_2)_x(CH_2CCH_3COO^-M^+)_y]_n$. In the SURLYN Ionomer Resins, ethylene and methacrylic acid copolymers are partially reacted with metallic salts.

General physical characteristics of the SURLYN Resins include a melting point between about 80° C. and about 100°

C. The resins are insoluble in water and are supplied in the form of solid white pellets. The compounds have a mild methacrylic acid odor. SURLYN ionomer resins have excellent impact toughness, flexibility, cut and abrasion resistance, low temperature performance and long term durability, especially at specific gravities of less than one. The SURLYN Ionomer Resins have room temperature tensile impact properties ranging from about 730 to about 1325 kJ/m$^2$ (345 to 630 ft-lb/in$^2$). This impact performance does not drop substantially with temperature, in that the compound can offer tensile impact as high as 1190 kJ/m$^2$ (565 ft-lb/in$^2$) at −40° C. Various grades of the SURLYN Ionomer Resins have a notched Izod rating as high as 853 J/m (16 ft-lb/in). The SURLYN Resins are also highly resistant to chemical attack and permeation by liquids. They have high melt strengths and contain no plasticizers. Ionomers adhere well to metals and to finishes of epoxy and urethane. The resins range in specific gravity from 0.94 to 0.97 g/cm$^3$.

Of the SURLYN Resin grades, a preferable grade is SURLYN 8528. Also preferred is SURLYN 8527, which has the same physical properties as 8528, but offers greater clarity. It is to be understood that any grade of SURLYN is contemplated as being of use in the present invention, however, the grade of SURLYN should not possess a melt viscosity which would be so high as to hinder the advantageous functioning of the present invention. Typical physical properties of SURLYN 8528 will be discussed hereinafter.

SURLYN 8528 has excellent abrasion and cut resistance. Its processing temperature is about 450° F. (232° C.). Its density is 58.6 lb/ft$^3$ (0.94 g/cm$^3$). Its brittle temperature is −139° F. (−95° C.). Its volume resistivity is 1.00×10$^{16}$ Ohm cm. Its dielectric constant is 2.40×10$^6$ Hz.

The SURLYN 8528 toughness properties include tensile impact at 23° C. (73° F.) of 1160 kJ/m$^2$ (550 ft-lbf/in$^2$). This is as found under ASTM Method D-1822S. Another toughness property is measured by the Notched izod test. This particular test is not as relevant for tubing—a more preferred test is a Cold Temperature Impact Test as described in Performance Requirements paragraph 9.11 in SAE Standard J844 as revised in June of 1990. However, the SURLYN 8528 Notched izod is 610 J/m (11.4 ft-lb per inch of notch) under ASTM Method D-256.

For low temperature toughness, the SURLYN 8528 tensile impact at −40° C. (−40° F.) is 935 kJ/m$^2$ (445 ft-lbf/in$^2$) under ASTM Method D-1822S.

Durability is measured by abrasion resistance under ASTM Method D-1630. The SURLYN 8528 resistance is 600 under the NBS index. For clarity measurement, the haze at 0.64 cm (0.25 in) under ASTM Method D-1003A is 6%. The specific gravity under ASTM Method D-792 is 0.94 g/cm$^3$.

The stiffness and other mechanical properties of SURLYN 8528 are given by the following. The flexural modulus at 23° C. (73° F.) under ASTM Method D-790 is 220 MPa (32 kpsi). The tensile strength, yield strength and elongation are measured on Type IV bars, compression molded, with a cross head speed of 5.0 cm/min (2 in/min). All three of these properties are measured by ASTM Method D-638. The tensile strength is 29 MPa (4.2 kpsi); the yield strength is 12.4 MPa (1.8 kpsi) and the elongation is 450%. The Ross Flex was tested on compression molded samples 3.2 mm thick, pierced 2.5 mm wide, under ASTM Method D-1052. Pierced at 23° C. (73° F.), the Ross Flex is 3000 cycles to failure; and pierced at −29° C. (−20° F.) is less than 100 cycles to failure. The MIT flex is an accelerated stress crack test on a strip 25 mil. thick, flexed through 2700 at 170 cycles per minute with one kilogram load in tension—#04 head. This is a test developed by Dupont. The result on the SURLYN 8528 was 2100 cycles to failure. The Shore D hardness is about 60 to 62.

General physical characteristics of SURLYN 8528 include cation type: sodium. The melt flow index, with the material dried 16 hours in a vacuum oven at 63° C. (145° F.) under ASTM Method D-1238 was 1.3 g/10 minutes. The area yield at 0.25 mm (0.10 in) was 4.2 m$^2$/kg (20.1 ft$^2$/lb).

Thermal characteristics include a heat deflection temperature at 455 kPa (66 psi) of about 44° C. to 51° C. (111° F. to 125° F.) under ASTM Method D-648. The Vicat temperature under ASTM Method D-1525-70 Rate B is 71° C. to 73° C. (159–163° F.). The melting point and freezing point is determined by differential thermal analysis. The melting point is 94° C. to 96° C. (201° F. to 204° F.); and the freezing point is 75° C. (167° F.). The coefficient of thermal expansion from −20° C. to 32° C. under ASTM Method D-696 is 14×10$^{-5}$ cm/cm/° C. The flammability under ASTM Method D-635 is 22.9 mm/min (0.9 in/min); and the flammability passed the Motor Vehicle Safety Standard 302. The thermal conductivity is 6.0×10$^{-4}$ cal/cm$^2$/sec/° C./cm. The specific heat at various degrees will be given. At −20° C. (68° F.), mean: the specific heat is 0.43 cal/gm/° C.; at 60° C. (140° F.), mean: the specific heat is 0.58 cal/gm/° C.; at melting point, mean: the specific heat is 0.86 cal/gm/° C.; and at 150° C. (302° F.), mean: the specific heat is 0.55 cal/gm/° C.

The thermoplastic elastomers which can successfully be employed in the tubing 22 of the present invention are commercially available under tradenames such as: SANTOPRENE®, a thermoplastic rubber commercially available from Advanced Elastomer Systems of St. Louis, Mo.; KRATON®, a thermoplastic rubber composed of a styrene-ethylene/butylene-styrene block copolymer commercially available from Shell Chemical Co. of Houston, Tex.; SARLINK, an oil resistant thermoplastic commercially available from Novacor Chemicals of Leominster, Mass.; and VICHEM, a family of polyvinyl chloride compounds commercially available from Vichem Corporation of Allendale, Mich.

Of the various thermoplastic elastomers suitable in the present invention, HYTREL is a preferred compound. HYTREL is a thermoplastic elastomer commercially available from E.I. DuPont de Nemours & Co., located in Wilmington, Del. It is contemplated that any grade of HYTREL is useful in the present invention, preferably such a grade which possesses a Shore D Hardness ranging between about 40 and about 55, and still more preferably, one having a Shore D Hardness of about 40. Grades having D40 (Shore) hardness include G-4074; G-4078; 4056; and 4059 FG.

The HYTREL grades listed above are polyester thermoplastic elastomers, and special features include excellent heat aging and oil (at high temperatures) resistance; can be used in light colored products; excellent low temperature properties, fatigue, flex and creep resistance.

Principal properties of the HYTREL grades listed above are as follows. Melt flow (condition): between about 5.2 g/10 min (E) and about 5.4 g/10 min (E); about 8.5 g/10 min (L). Melting point: between about 298° F. and about 383° F. Density: between about 1.11 g/cm$^3$ and about 1.18 g/cm$^3$. Tensile strength, yield: between about 450 lb/in$^2$ and about 550 lb/in$^2$ (with 10% strain). Tensile strength, break: between about 2.00×10$^3$ lb/in$^2$ and about 4.05×10$^3$ lb/in$^2$. Elongation, break: between about 170% and about 600%. Flexural modulus: between about 8.00×10$^3$ lb/in$^2$ and about 9.80×10³ lb/in². Izod, Notched, R.T.: about 999 ft-lb/in (no break). Vicat Soft Point: between about 226° F. and about 273° F. Water Absorption, 24 hour: between about 0.60% and about 2.50%.

A suitable nylon material includes 12 carbon block polyamides, 11 carbon block polyamides, and zinc chloride resistant 6 carbon block polyamides. Of these, Nylon 12 and zinc chloride resistant Nylon 6 are preferred. The 6-carbon block polyamide or Nylon 6 either inherently exhibits zinc chloride resistance or contains sufficient quantities of modifying agents to impart a level of zinc chloride resistance greater than or equal to that required by Performance Requirement 9.6 as outlined in SAE Standard J844 (Revised June 1990), i.e. non-reactivity after 200 hour immersion in a 50% by weight zinc chloride solution. The Nylon 6 can also be modified with various plasticizers, flame retardants and the like in manners which would be known to one reasonably skilled in the art.

Suitable fluoropolymers may include polyvinylidine fluoride, polyvinyl fluoride, ethylene tetrafluoroethylene, and mixtures thereof. The material can also be a graft copolymer of the preceding materials together with a fluorine-containing polymer such as copolymers of vinylidine fluoride and chlorotrifluoroethane. Suitable material employed may contain between about 60% and about 80% by weight polyvinylidine difluoride. Materials so formed have a melting point between about 200° C. and about 220° C. and a molding temperature between about 210° C. and about 230° C. Further suitable fluoropolymers include: a copolymer of a vinyl fluoride and chlorotrifluoroethylene, the vinyl fluoride material selected from the group consisting of polyvinylidine fluoride, polyvinyl fluoride, and mixtures thereof; a copolymer of vinyl fluoride material and ethylene tetrafluoroethylene; a non-fluorinated elastomer, and mixtures thereof. The material of choice exhibits an affinity to polymers employed in the first 27 second 29 or third 31 layers, such as, for example, Nylon 12 or Nylon 6. Some suitable fluoropolymers are commercially available under the tradename "ADEFLON A" from Atochem Inc. elf Aquitaine Group of Philadelphia, Pa.

Other suitable materials, especially useful in an interposed layer 31 or in sublayers of any of the three layers 27, 29, 31 include ethylene vinyl alcohol, selected from the group consisting of copolymers of substituted or unsubstituted alkenes having less than four carbon atoms and vinyl alcohol, and mixtures thereof. Also useful are copolymers of alkenes having less than four carbon atoms and vinyl acetate. Also suitable are polyolefin compounds, including, but not limited to polyethylene, low density polyethylene, and polypropylene.

The following is a brief description of the various exemplary, commercially available compounds described hereinabove. It is to be understood that these are examples of suitable compounds for illustrative purposes. Thus, it is to be further understood that other suitable compounds are contemplated and are within the scope of the present invention.

SANTOPRENE®, commercially available from Advanced Elastomer Systems, L.P. of St. Louis, Mo. is a thermoplastic rubber FR grade. Aside from the thermoplastic rubber, it also contains antimony trioxide flame retardant, and may contain carbon black, CASE No. 1333-86-4. SANTOPRENE® thermoplastic rubber may react with strong oxidizing chemicals, and also reacts with acetal resins at temperatures of 425° F. and above, producing decomposition of the acetal resins, and formaldehyde as a decomposition product. Decomposition of halogenated polymers and phenolic resins may also be accelerated when they are in contact with SANTOPRENE® thermoplastic rubber at processing temperatures. Physical characteristics of SANTOPRENE® include a slightly rubber-like odor, and the appearance of black or natural (colorable) pellets. It is thermally stable to 500° F. The flash ignition temperature is greater than 650° F. by method ASTM-D 1929-77, and by the same method, self-ignition temperature is above 700° F. The typical specific gravity is 0.90 to 1.28. The material has various hardnesses which are suitable in the present invention, however, in the preferred embodiment, the SANTOPRENE® thermoplastic rubber having an 80 Shore A hardness is utilized. The SANTOPRENE® thermoplastic rubber is designed to offer fluid and oil resistance equivalent to that of conventional thermoset rubbers such as neoprene. The resistance of the SANTOPRENE® rubber grades to oils can be classified by using the SAE J200/ASTM D2000 standard classification system for rubber.

ADEFLON A is a polyvinylidene fluoride commercially available from Atochem Inc. elf Aquitaine Group of Philadelphia, Pa. Its typical use is as a binding material for polyamides/polyvinylidene fluoride. The product is stable under normal use conditions, and above 230° C., there is a release of monomer traces. Physical properties include: at 20° C. the material is a granulated solid having a white/slightly yellow color and no odor. The crystal melting point is 175° C., and beginning of decomposition is 230° C. In water at 20° C., the product is non-soluble. The density at 20° C. bulk is 1 to 1.1 g/cm³.

The Vichem Corporation vinyl compounds are polyvinyl chloride compounds composed of a vinyl resin and functioning additives. The ingredients include a stabilizer, a resin CASE No. 75-01-4, a plasticizer CASE No. 68515-49-1, an epoxy soya oil CASE No. 8013-07-8, a filler CASE No. 1317-65-3 and carbon black CASE No. 1333-85-4. The specific gravity is 1.35 and the compound has the appearance of pellets and has a characteristically bland odor.

KRATON®, commercially available from Shell Chemical Co. of Houston, Tex., is a thermoplastic rubber having a specific gravity of 0.90 to 1.90 and a hardness of 15A to 60D. The tensile strength is up to 2,500 psi. The elongation is up to 750% and the tear strength is up to 750 pli (130 kN/m). The flex modulus is 750 to 100,000 psi. The service temperature is −70° C. to 150° C. The ozone resistance is excellent, UV resistance is excellent, fluid resistance is fair to excellent, and flame resistance is fair to excellent.

SARLINK is a thermoplastic elastomer commercially available from Novacor Chemicals Inc. of Leominster, Massachusetts. The specific gravity ranges from 1.13 to 1.22. The modulus at 100% ranges between 260 and 570 psi. The tensile strength ranges between 780 and 2,060 psi. The ultimate elongation ranges between about 345 and about 395%. The tear strength ranges between about 81 and about 196 pli. The tension set ranges between about 4 and 6%. It has excellent fluid resistance to acids and alkalis, aqueous solutions, organic solvents, petroleum oils and fuels, automotive fluids such as automatic transmission, power steering, etc. and industrial fluids. It has fair fluid resistance to automotive fluids such as hydraulic brake, lithium grease, antifreeze, etc. and poor resistance to organic solvents. The SARLINK product is a solid, black pellet material with a mildly pungent odor. It is insoluble in water at 20° C.

Another suitable fluoropolymer is KYNAR, commercially available from Atochem Inc. elf Aquitaine Group of Philadelphia, Pa. KYNAR is a vinylidene fluoridehexafluoropropylene copolymer. Its chemical name is 1-propene,1,1,2,3,3,3-hexafluoro-1,1-difluoroethene polymer. Its melting point is 155°–160° C. Its specific gravity is 1.77–1.79 at 23° C. It appears translucent and has no odor.

Another suitable fluoropolymer is CEFRAL SOFT XUA-2U, commercially available from Central Glass Company, Ltd., Chiyodaku, Tokyo, Japan is a copolymer containing 40% vinylidene fluoride-chlorotrifluoroethylene copolymer, 30% polyvinylidene fluoride and 30% Nylon 12. The material has a specific gravity of 1.45 at 23° C., a melting point of 173° C. and a mold temperature of 220° F. The material has an elongation at break of 478% and a tensile strength of 430 Kgf/cm$^2$.

Yet another suitable fluoropolymer is TEFZEL, which is commercially available from DuPont Polymers, Specialty Polymer Division, Wilmington, Del. The material designates a family of ethylene tetrafluoroethylene fluoropolymers having various commercial grades. The material has a melting point between 255° C. and 280° C. as determined by ASTM method DTA D3418. The specific gravity for the material is between 1.70 and 1.72 as determined by ASTM method D792. Impact strength for the material at −65° F. is between 2.0 ft-lbs/inch and 3.5 ft-lbs/inch as determined by ASTM method D256, commonly referred to as Notched Izod Impact Strength. The hardness durometer as determined by ASTM method D2240 for all grades of TEFZEL is D70. Tensile strength at 73° F. is between 5,500 psi and 7,000 psi. TEFZEL was first introduced in 1970 having outstanding mechanical strength, high temperature and corrosion resistance. The material is available in three production grades, TEFZEL 200, TEFZEL 210 and TEFZEL 280 which can be applied in the present invention. Ultimate elongation at break is between 150% and 300%, depending on the grade as determined by ASTM method D638.

The multi-layer tube 22 may have the first polymeric layer 27 consisting essentially of an ionomer and a nylon, such as ethylene methacrylic acid copolymer—partial metal salt, and Nylon 12. This may be in any suitable percent composition and may have any additional suitable additives. In the preferred embodiment, this percent composition ratio is between about 10% and about 70% ethylene methacrylic acid copolymer-partial metal salt, and between about 90% and about 30% Nylon 12 . More preferably, this percent composition ratio is between about 40% and about 60% ethylene methacrylic acid copolymer—partial metal salt, and between about 60% and about 40% Nylon 12.

The second polymeric layer 29 may consist essentially of a nylon. In the preferred embodiment, this layer is Nylon 12.

Third layer 31 may be any of the suitable materials listed hereinabove. In an alternate preferred embodiment, this third layer 31 may be a "regrind" or "recycle" of the suitable polymeric materials enumerated above. It is to be understood that the definition of "regrind" or "recycled" material as used herein comprises any generation of "regrind" or "recycled" material which substantially possesses between about 65% and about 95% (or higher) of each of the cold temperature impact, viscosity and elongation properties of the virgin material; more preferably, possesses between about 80% and 95%, and still more preferably possesses between about 90% and 95%. However, it is to be understood that any suitable regrind which performs in the desired manner in the present invention is contemplated and may successfully be used herein. If such a "regrind" is used as third layer 31, it is preferred that a virgin material be used as second (outer) layer 29.

Among some advantages of regrind material is that it is believed that the regrind is a lower viscosity material, which may enhance extrusion capabilities. Further, regrind is more rigid than virgin material, thereby improving penetration resistance as well as resistance to other damaging wear characteristics.

To further illustrate the composition, the following examples are given. It is to be understood that these examples are provided for illustrative purposes and are not to be construed as limiting the scope of the present invention.

EXAMPLE I

A 3/16 inch brazed steel tube had a GALFAN coating of 78 g/m$^2$ and a phosphate coating of 120–250 mg/ft$^2$. Applied thereto was a coating of 0.005 inch to 0.010 inch Nylon 12. In a subsequent test, two layers of Nylon 12 having a total thickness between about 0.005 inch to 0.010 inch were also applied. In another subsequent test, three layers of Nylon 12 having a total thickness between about 0.005 inch to 0.010 inch were also applied. In all three tests, the Nylon 12 formed a tough, abrasion and corrosion resistant coating which strongly adhered to the steel tube outer surface.

EXAMPLE II

A 3/16 inch brazed steel tube had a GALFAN and phosphate coating as noted in Example I, with an additional chromate wash, with the chromate wash having essentially no remaining weight. A first polymeric layer was applied to the surface treated tube, the layer consisting essentially of 20% SURLYN 8528 and 80% Nylon 12. Two subsequent layers of Nylon 12 were then applied. The total thickness of the three polymeric layers ranged between about 0.005 inch to 0.010 inch. The three layers formed a tough, abrasion and corrosion resistant coating which appeared to more strongly adhere to the steel tube outer surface than did the application of Nylon 12 as outlined in Example I.

EXAMPLE III

A 3/16 inch brazed steel tube has a GALFAN coating of between about 36–95 g/m$^2$ and a phosphate coating of 120–250 mg/ft$^2$. A first layer of SURLYN 8528 is applied thereto. In a subsequent layer, 20% SURLYN 8528 and 80% Nylon 12 is applied. As an outer layer, Nylon 12 is applied. The three layers form a tough, abrasion and corrosion resistant coating which strongly adheres to the steel tube outer surface.

EXAMPLE IV

A 3/16 inch brazed steel tube has a GALFAN coating of between about 36–95 g/m$^2$ and a phosphate coating of 120–250 mg/ft$^2$. A first layer of 20% SURLYN 8528 and 80% Nylon 12 is applied. A second layer of Nylon 6 (zinc chloride resistant) is applied. A third layer of ethylene vinyl alcohol is applied. A fourth layer of Nylon 6 (zinc chloride resistant) is applied. A fifth layer of a blend of Nylon 6 (zinc chloride resistant) and Nylon 12 is applied. A sixth, outer layer of Nylon 12 is applied. The six layers form a tough, abrasion and corrosion resistant coating which strongly adheres to the steel tube outer surface.

EXAMPLE V

Each of the tests contained in the above Examples are also performed on 5/16 inch welded steel tubes and 3/8 inch welded steel tubes, and give the same results noted above.

EXAMPLE VI

A 5/16 inch welded steel tube had no surface treatment. Applied thereto was a coating of 0.005 inch to 0.010 inch Nylon 12. In a subsequent test, two layers of Nylon 12 having a total thickness between about 0.005 inch to 0.010 inch were also applied. In another subsequent test, three layers of Nylon 12 having a total thickness between about 0.005 inch to 0.010 inch were also applied. In all three tests, the Nylon 12 formed a decorative coating surrounding the steel tube outer surface.

EXAMPLE VII

3/16" and 1/4" brazed steel tubing were prepared according to Example I, where two layers of Nylon 12 having a total thickness between about 0.005 inch to 0.010 inch were applied to each of the tubes. Each of the 3/16" and 1/4" tube ends were placed through a 0.213" diameter entry bushing and a 0.275" diameter entry bushing, respectively, into a WD-1LTC-200 (200 Watt) Laser Wire Stripper modified with the defocusing lens discussed hereinabove. The laser beam was activated to impinge the outer circumference of the end of each of the non-rotating tubes, and, in 3.5 seconds, a length of 6 mm of both layers of Nylon 12 was removed from the outer circumference of the ends, leaving a tapered transition portion having a length of 1.27 mm. Under electron beam microscope analysis, it was determined that the GALFAN/phosphate coating was undamaged. The tubes had a satisfactory amount of Nylon 12 removed to prepare them for subsequent SAE or ISO endforming.

EXAMPLE VIII

3/16" and 1/4" tubing were prepared as in Example VII. An ultra thin, shiny polymeric residue was detected on the laser removed surface of each tube. The laser removed surface of both the 3/16" and 1/4" tubing passed 1,100 hours before forming red rust buildup larger than 1 mm in diameter, using Standard Method of Salt Spray (Fog) Testing ASTM B 117-73.

EXAMPLE IX

3/16" and 1/4" brazed steel tubing are prepared according to Example I, where two layers of Nylon 12 having a total thickness between about 0.005 inch to 0.010 inch are applied to each of the tubes. Each of the 3/16" and 1/4" tube ends are placed through a 0.213" diameter entry bushing and a 0.275" diameter entry bushing, respectively, into a WD-1LTC-100 (100 Watt) Laser Wire Stripper modified with the defocusing lens discussed hereinabove. The laser beam is activated to impinge the outer circumference of the end of each of the non-rotating tubes, and, in 3.5 seconds, a length of 6 mm$^2$ of both layers of Nylon 12 is removed from the outer circumference of the ends, leaving a tapered transition portion having a length of 1.27 mm. Under electron beam microscope analysis, it is determined that the GALFAN/phosphate coating is undamaged. The tubes have a satisfactory amount of Nylon 12 removed to prepare them for subsequent SAE or ISO endforming.

EXAMPLE X

3/16" and 1/4" tubing are prepared as in Example IX. An ultra thin, shiny polymeric residue is detected on the laser removed surface of each tube. The laser removed surface of both the 3/16" and 1/4" tubing passes 1,100 hours before forming red rust buildup larger than 1 mm in diameter, using Standard Method of Salt Spray (Fog) Testing ASTM B 117-73.

While the invention has been described in connection with what is presently considered to be the most practical and preferred embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A multi-layer tube, comprising:
    metal tube having an outer surface and an end;
    a corrosion resistant layer bonded to the metal tube outer surface, wherein the corrosion resistant layer comprises a zinc layer;
    a surface treatment layer bonded to the corrosion resistant layer;
    a first polymeric layer disposed on the surface treatment layer;
    a second polymeric layer disposed on the first polymeric layer;
    a laser-removed portion of the metal tube outer surface, being adjacent and disposed 360° about the end, the laser-removed portion being substantially free from the first and second polymeric layers, while leaving at least the corrosion resistant layer intact; and
    a generally tapered transition portion of the polymeric layers, extending from an upper surface of the second polymeric layer toward the laser-removed portion of the metal tube outer surface circumference at the end.

2. The multi-layer tube as defined in claim 1 wherein the length of the transition portion is approximately 1.27 mm (0.05").

3. The multi-layer tube as defined in claim 1, further comprising an ultra thin, corrosion resistance-enhancing polymeric residue on a discrete area of the laser-removed portion of the metal tube outer surface circumference.

4. The multi-layer tube as defined in claim 3, wherein the ultra thin residue has a thickness sufficient to enhance the corrosion resistance of the laser removed metal tube outer surface circumference such that the laser removed metal tube outer surface passes up to about 1,100 hours of a standard salt spray (fog) test before forming red rust buildup larger than about 1 mm (0.04") in diameter.

5. The multi-layer tube as defined in claim 4 wherein the first polymeric layer is selected from the group consisting of thermoplastic elastomers, ionomers, nylons, fluoropolymers, and mixtures thereof; and wherein the second polymeric layer is selected from the group consisting of nylons, thermoplastic elastomers, fluoropolymers, and mixtures thereof.

6. The multi-layer tube as defined in claim 5, further comprising a third polymeric layer interposed between, and bonded to the first and second polymeric layers, wherein the third polymeric layer is selected from the group consisting of ionomers, nylons, ethylene vinyl alcohol, polyolefins, and mixtures thereof.

7. The multi-layer tube as defined in claim 1 wherein the first polymeric layer is extruded onto the metal tube, such that it bonds to the surface treatment layer, and wherein the second polymeric layer is extruded onto the metal tube, such that it bonds to the first polymeric layer.

8. The multi-layer tube as defined in claim 7 wherein the metal tube is a brazed steel tube.

9. The multi-layer tube as defined in claim 1 wherein each of the first and second polymeric layers consists essentially of Nylon 12.

10. The multi-layer tube as defined in claim 9 wherein the first polymeric layer is extruded onto the metal tube, such that it bonds to the surface treatment layer, and wherein the second polymeric layer is extruded onto the metal tube, such that it bonds to the first polymeric layer.

11. The multi-layer tube as defined in claim 1 wherein the multi-layer tube is a high pressure fluid conduit having two ends, the polymeric layer portion is removed from each end, and wherein each of the conduit two ends is endformed into at least one of: a double or inverted flare; and an annularly protruding flare, wherein each of the flares is formed approximately where the polymeric layer portion is removed.

12. The multi-layer tube as defined in claim 1 wherein the multi-layer tube is at least one of a brakeline, a vacuum line, a transmission oil cooler line, a vapor return line, and a fuel line.

13. A multi-layer tube, comprising:
a metal tube having an outer surface and two ends;
a corrosion resistant layer bonded to the metal tube outer surface, wherein the corrosion resistant layer comprises a zinc layer;
a surface treatment layer bonded to the corrosion resistant layer;
a first polymeric layer bonded to the surface treatment layer, the first polymeric layer consisting essentially of Nylon 12;
a second polymeric layer bonded to the first polymeric layer, the second polymeric layer consisting essentially of Nylon 12;
two laser-removed portions of the metal tube outer surface, being adjacent and disposed 360° about each end, the laser-removed portions being substantially free from the first and second polymeric layers, while leaving at least the corrosion resistant layer intact; and
a generally tapered transition portion of the polymeric layers, extending from an upper surface of the second polymeric layer toward the laser-removed portions of the metal tube outer surface circumference at each end;
wherein the multi-layer tube is at least one of a brakeline, a vacuum line, a transmission oil cooler line, a vapor return line, and a fuel line.

14. A multi-layer tube comprising:
a metal tube having an outer surface and an end;
a polymeric layer disposed on the tube outer surface; and
a laser-removed portion of the metal tube outer surface adjacent and disposed 360° about the end, the portion having had the polymeric layer disposed thereon, and the portion having had the polymeric layer substantially removed by a laser, while leaving the tube outer surface undamaged.

15. The multi-layer tube as defined in claim 14, further comprising an ultra thin, corrosion resistance enhancing polymeric residue on a discrete area of the portion of the metal tube outer surface circumference.

16. The multi-layer tube as defined in claim 15 wherein the ultra thin residue has a thickness sufficient to enhance the corrosion resistance of the portion of the metal tube outer surface circumference such that the portion passes up to about 1,100 hours of a standard salt spray (fog) test before forming red rust buildup larger than about 1 mm (0.04") in diameter.

17. The multi-layer tube as defined in claim 14 wherein the polymeric layer is selected from the group consisting of thermoplastic elastomers, ionomers, nylons, fluoropolymers, and mixtures thereof.

18. The multi-layer tube as defined in claim 14 wherein the multi-layer tube is at least one of a brakeline, a vacuum line, a transmission oil cooler line, a vapor return line, and a fuel line.

19. The multi-layer tube as defined in claim 14 wherein the polymeric layer is a first polymeric layer, wherein the multi/layer tube further comprises a second polymeric layer disposed on the first polymeric layer, and wherein the laser-removed portion is substantially free from the first and second polymeric layers.

20. The multi-layer tube as defined in claim 19 wherein the second polymeric layer is selected from the group consisting of nylons, thermoplastic elastomers, fluoropolymers, and mixtures thereof.

21. The multi-layer tube as defined in claim 19 wherein the first polymeric layer is extruded onto the metal tube, such that it bonds to the tube outer surface, and wherein the second polymeric layer is extruded onto the metal tube, such that it bonds to the first polymeric layer.

22. A multi-layer tube comprising:
a metal tube having an outer surface and an end;
a polymeric layer disposed on the tube outer surface; and
a portion of the metal tube outer surface adjacent and disposed 360° about the end, the portion having had the polymeric layer disposed thereon, and the portion having had the polymeric layer substantially removed by a laser, while leaving the tube outer surface undamaged, wherein the multi-layer tube is a high pressure fluid conduit having two ends, the polymeric layer portion is removed from each end, and wherein each of the conduit two ends is endformed into at least one of: a double or inverted flare; and an annularly protruding flare, wherein each of the flares is formed approximately where the polymeric layer portion is removed.

23. A multi-layer tube comprising:
a metal tube having an outer surface and an end;
a first polymeric layer disposed on the tube outer surface;
a second polymeric layer disposed on the first polymeric layer; and
a portion of the metal tube outer surface adjacent and disposed 360° about the end, the portion having had the first and second polymeric layers disposed thereon, and the portion having had the first and second polymeric layers substantially removed by a laser, while leaving the tube outer surface undamaged, wherein the laser-removed portion is substantially free from the first and second polymeric layers, and wherein each of the first and second polymeric layers consists essentially of Nylon 12.

24. A multi-layer tube comprising:
a metal tube having an outer surface and an end;
a polymeric layer disposed on the tube outer surface;
a portion of the metal tube outer surface adjacent and disposed 360° about the end, the portion having had the polymeric layer disposed thereon, and the portion having had the polymeric layer substantially removed by a laser, while leaving the tube outer surface undamaged; and
a generally tapered transition portion of the polymeric layer, extending from an upper surface of the polymeric layer toward the laser-removed portion of the metal tube outer surface circumference at the end.

25. A multi-layer tube comprising:
a metal tube having an outer surface and an end;
a polymeric layer disposed on the tube outer surface; and a portion of the metal tube outer surface adjacent and disposed 360° about the end, the portion having had the polymeric layer disposed thereon, and the portion having had the polymeric layer substantially removed by a laser, while leaving the tube outer surface undamaged, wherein the metal tube is surface treated with a treatment material selected from the group consisting of zinc plating, zinc nickel alloys, zinc cobalt alloys, zinc aluminum alloys, zinc/aluminum/rare earth alloys, phosphates, chromates, zinc, tin, lead, nickel, copper, oxides, protective paints, and mixtures thereof, wherein the polymeric layer is disposed on the treated tube outer surface, and wherein the laser-removed portion is substantially free from the polymeric layer, while leaving the treatment material intact.

26. The multi-layer tube as defined in claim 25 wherein the polymeric layer is a first polymeric layer, wherein the multi-layer tube further comprises a second polymeric layer disposed on the first polymeric layer, and wherein the laser-removed portion is substantially free from the first and second polymeric layers.

27. The multi-layer tube as defined in claim 25 wherein the multi-layer tube is at least one of a brakeline, a vacuum line, a transmission oil cooler line, a vapor return line, and a fuel line.

28. A multi-layer tube comprising:
a metal tube having been treated with at least one metal compound for corrosion resistance, thereby forming a metal tube substrate having an outer surface and an end;
a polymeric layer disposed on the substrate outer surface; and
a laser-removed portion of the substrate outer surface adjacent and disposed 360° about the end, the portion having had the polymeric layer disposed thereon, and the portion having had the polymeric layer substantially removed by a laser, while leaving the substrate outer surface undamaged;
wherein the multi-layer tube is at least one of a brakeline, a vacuum line, a transmission oil cooler line, a vapor return line, and a fuel line.

29. The multi-layer tube as defined in claim 28, further comprising an ultra thin, corrosion resistance-enhancing polymeric residue on a discrete area of the laser-removed portion of the metal tube outer surface circumference, wherein the ultra thin residue has a thickness sufficient to enhance the corrosion resistance of the portion of the substrate outer surface circumference such that the portion passes up to about 1,100 hours of a standard salt spray (fog) test before forming red rust buildup larger than about 1 mm (0.04") in diameter.

30. The multi-layer tube as defined in claim 28 wherein the polymeric layer is selected from the group consisting of thermoplastic elastomers, ionomers, nylons, fluoropolymers, and mixtures thereof.

31. The multi-layer tube as defined in claim 30 wherein the polymeric layer is a first polymeric layer, wherein the multi-layer tube further comprises a second polymeric layer disposed on the first polymeric layer, wherein the portion is substantially free from the first and second polymeric layers, and wherein the second polymeric layer is selected from the group consisting of nylons, thermoplastic elastomers, fluoropolymers, and mixtures thereof.

32. The multi-layer tube as defined in claim 31 wherein the first polymeric layer is extruded onto the metal tube, such that it bonds to the substrate outer surface, and wherein the second polymeric layer is extruded onto the metal tube, such that it bonds to the first polymeric layer.

33. The multi-layer tube as defined in claim 31, further comprising a generally tapered transition portion of the polymeric layers, extending from an upper surface of the second polymeric layer toward the portion of the substrate outer surface circumference at the end.

34. A multi-layer tube comprising:
a metal tube having been treated with at least one metal compound for corrosion resistance, thereby forming a metal tube substrate having an outer surface and an end;
a polymeric layer disposed on the substrate outer surface; and
a portion of the substrate outer surface adjacent and disposed 360° about the end, the portion having had the polymeric layer disposed thereon, and the portion having had the polymeric layer substantially removed by a laser, while leaving the substrate outer surface undamaged, wherein the multi-layer tube is at least one of a brakeline, a vacuum line, a transmission oil cooler line, a vapor return line, and a fuel line, and wherein the multi-layer tube is a high pressure fluid conduit having two ends, the polymeric layer portion is removed from each end, and wherein each of the conduit two ends is endformed into at least one of: a double or inverted flare; and an annularly protruding flare, wherein each of the flares is formed approximately where the polymeric layer portion is removed.

35. A multi-layer tube comprising:
a metal tube having been treated with at least one metal compound for corrosion resistance, thereby forming a metal tube substrate having an outer surface and an end;
a first polymeric layer disposed on the substrate outer surface;
a second polymeric layer disposed on the first polymeric layer; and
a portion of the substrate outer surface adjacent and disposed 360° about the end, the portion having had the first and second polymeric layers disposed thereon, and the portion having had the first and second polymeric layers substantially removed by a laser, while leaving the substrate outer surface undamaged;
wherein the multi-layer tube is at least one of a brakeline, a vacuum line, a transmission oil cooler line, a vapor return line, and a fuel line, and wherein each of the first and second polymeric layers consists essentially of Nylon 12.

36. A multi-layer tube comprising:
a metal tube having been treated with at least one metal compound for corrosion resistance, thereby forming a metal tube substrate having an outer surface and an end;
a polymeric layer disposed on the substrate outer surface;
a portion of the substrate outer surface adjacent and disposed 360° about the end, the portion having had the polymeric layer disposed thereon, and the portion having had the polymeric layer substantially removed by a laser, while leaving the substrate outer surface undamaged, wherein the multi-layer tube is at least one of a brakeline, a vacuum line, a transmission oil cooler line, a vapor return line, and a fuel line; and
a generally tapered transition portion of the polymeric layer, extending from an upper surface of the polymeric layer toward the portion of the substrate outer surface circumference at the end.

37. A multi-layer tube comprising:

a metal tube having an outer surface and an end;

a polymeric layer disposed on the tube outer surface; and a laser-removed portion of the metal tube outer surface adjacent and disposed 360° about the end, the portion having had the polymeric layer disposed thereon, and the portion having had the polymeric layer substantially removed by a laser, while leaving the tube outer surface undamaged, wherein the polymeric layer is a first polymeric layer, wherein the multi-layer tube further comprises a second polymeric layer disposed on the first polymeric layer, and wherein the laser-removed portion is substantially free from the first and second polymeric layers, the polymeric layers further comprising a generally tapered transition portion extending from an upper surface of the second polymeric layer toward the laser-removed portion of the metal tube outer surface circumference at the end.

38. A multi-layer tube comprising:

a metal tube having an outer surface and an end;

a polymeric layer disposed on the tube outer surface; and a portion of the metal tube outer surface adjacent and disposed 360° about the end, the portion having had the polymeric layer disposed thereon, and the portion having had the polymeric layer substantially removed by a laser, while leaving the tube outer surface undamaged, wherein the metal tube is surface treated with a treatment material selected from the group consisting of zinc plating, zinc nickel alloys, zinc cobalt alloys, zinc aluminum alloys, zinc/aluminum/rare earth alloys, phosphates, chromates, zinc, tin, lead, nickel, copper, oxides, protective paints, and mixtures thereof, wherein the polymeric layer is disposed on the treated tube outer surface, and wherein the laser-removed portion is substantially free from the polymeric layer, while leaving the treatment material intact; the polymeric layer further comprising a generally tapered transition portion extending from an upper surface of the polymeric layer toward the laser-removed portion of the metal tube outer surface circumference at the end.

39. A multi-layer tube comprising:

a metal tube having an outer surface and an end;

a polymeric layer disposed on the tube outer surface; and a portion of the metal tube outer surface adjacent and disposed 360° about the end, the portion having had the polymeric layer disposed thereon, and the portion having had the polymeric layer substantially removed by a laser, while leaving the tube outer surface undamaged, wherein the metal tube is surface treated with a treatment material selected from the group consisting of zinc plating, zinc nickel alloys, zinc cobalt alloys, zinc aluminum alloys, zinc/aluminum/rare earth alloys, phosphates, chromates, zinc, tin, lead, nickel, copper, oxides, protective paints, and mixtures thereof, wherein the polymeric layer is disposed on the treated tube outer surface, and wherein the laser-removed portion is substantially free from the polymeric layer, while leaving the treatment material intact, wherein the multi-layer tube is a high pressure fluid conduit having two ends, the polymeric layer portion is removed from each end, and wherein each of the conduit two ends is endformed into at least one of: a double or inverted flare; and an annularly protruding flare, wherein each of the flares is formed approximately where the polymeric layer portion is removed.

* * * * *